US012737302B2

(12) United States Patent
Terpstra et al.

(10) Patent No.: US 12,737,302 B2
(45) Date of Patent: Sep. 15, 2026

(54) CONCURRENT SUPPORT FOR MULTIPLE CACHE INCLUSIVITY SCHEMES USING LOW PRIORITY EVICT OPERATIONS

(71) Applicant: SiFive, Inc., Santa Clara, CA (US)

(72) Inventors: Wesley Terpstra, San Mateo, CA (US); Richard Van, San Jose, CA (US); Eric Andrew Gouldey, Fort Collins, CO (US)

(73) Assignee: SiFive, Inc., Santa Clara, CA (US)

( * ) Notice: Subject to any disclaimer, the term of this patent is extended or adjusted under 35 U.S.C. 154(b) by 37 days.

(21) Appl. No.: 19/044,137

(22) Filed: Feb. 3, 2025

(65) Prior Publication Data

US 2025/0181519 A1 Jun. 5, 2025

Related U.S. Application Data

(63) Continuation of application No. 18/390,223, filed on Dec. 20, 2023, now Pat. No. 12,259,825.

(60) Provisional application No. 63/434,080, filed on Dec. 20, 2022.

(51) Int. Cl.
*G06F 12/121* (2016.01)
*G06F 12/0811* (2016.01)
*G06F 12/084* (2016.01)

(52) U.S. Cl.
CPC .......... *G06F 12/121* (2013.01); *G06F 12/084* (2013.01)

(58) Field of Classification Search
CPC .. G06F 12/0811; G06F 12/084; G06F 12/121; G06F 12/08; G06F 12/126
USPC .......................................................... 711/113
See application file for complete search history.

(56) References Cited

U.S. PATENT DOCUMENTS 12,259,825 B2 3/2025 Terpstra et al.
2020/0285592 A1 9/2020 Ambroladze et al.
2021/0149819 A1* 5/2021 Kotra .................. G06F 12/1027
2023/0195643 A1* 6/2023 Nakra ................. G06F 12/0804 711/3

(Continued)

FOREIGN PATENT DOCUMENTS

EP 4 006 734 A1 6/2022

OTHER PUBLICATIONS

Search Report for Application No. GB2508467.4, issued Jun. 19, 2025, 3 pages.

(Continued)

*Primary Examiner* — Hashem Farrokh
(74) *Attorney, Agent, or Firm* — Kilpatrick Townsend & Stockton LLP

(57) ABSTRACT

Systems and methods are disclosed for concurrent support for multiple cache inclusivity schemes using low priority evict operations. For example, some methods may include, receiving a first eviction message having a lower priority than probe messages from a first inner cache; receiving a second eviction message having a higher priority than probe messages from a second inner cache; transmitting a third eviction message, determined based on the first eviction message, having the lower priority than probe messages to a circuitry that is closer to memory in a cache hierarchy; and, transmitting a fourth eviction message, determined based on the second eviction message, having the lower priority than probe messages to the circuitry that is closer to memory in the cache hierarchy.

20 Claims, 15 Drawing Sheets

(56) References Cited

U.S. PATENT DOCUMENTS

2024/0184707 A1* 6/2024 Klinglesmith ...... G06F 12/0891

OTHER PUBLICATIONS

U.S. Appl. No. 18/390,223, Notice of Allowance, mailed Jan. 15, 2025, 8 pages.
Search Report for Application No. GB2319679.3, date of search Jun. 24, 2024, 1 page.

* cited by examiner

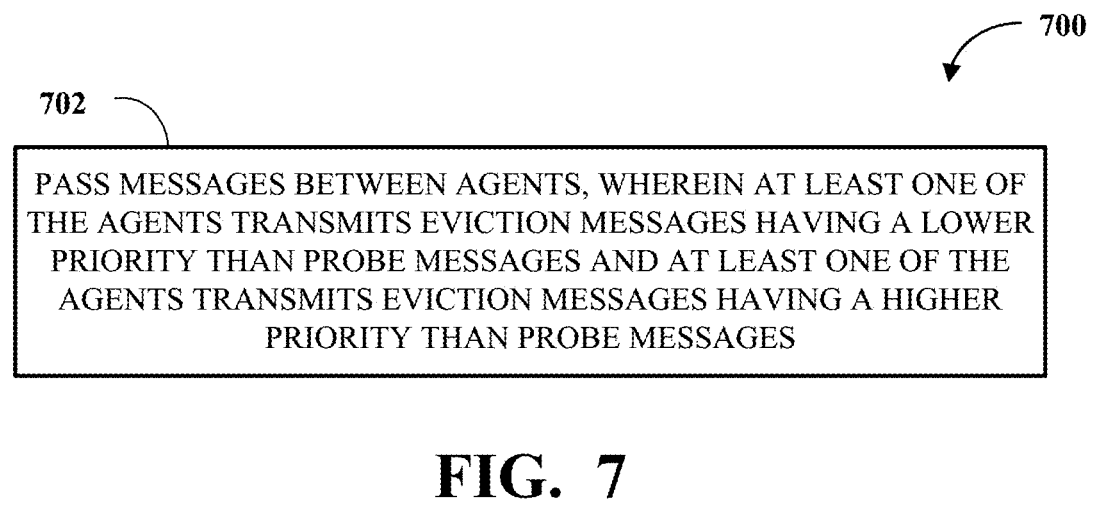

700

702

PASS MESSAGES BETWEEN AGENTS, WHEREIN AT LEAST ONE OF THE AGENTS TRANSMITS EVICTION MESSAGES HAVING A LOWER PRIORITY THAN PROBE MESSAGES AND AT LEAST ONE OF THE AGENTS TRANSMITS EVICTION MESSAGES HAVING A HIGHER PRIORITY THAN PROBE MESSAGES

FIG. 7

CONCURRENT SUPPORT FOR MULTIPLE CACHE INCLUSIVITY SCHEMES USING LOW PRIORITY EVICT OPERATIONS

CROSS-REFERENCE TO RELATED APPLICATION

This application is a Continuation of U.S. application Ser. No. 18/390,223, filed Dec. 20, 2023, which claims priority to and the benefit of U.S. Provisional Patent Application Ser. No. 63/434,080, filed Dec. 20, 2022, the entire disclosure of which is hereby incorporated by reference.

TECHNICAL FIELD

This disclosure relates generally to concurrent support for multiple cache inclusivity schemes using low priority evict operations.

BACKGROUND

A System-on-Chip (SoC) is an integrated circuit that includes multiple components connected to one another. The components may include, for example, processor cores, caches, cross bars, memory controllers, and memory-mapped devices. The components may be connected so that data can be transferred between them while adhering to a coherence policy, such as the MSI (modified, shared, invalid), MESI (modified, exclusive, shared, invalid), or MOESI (modified, owned, shared, exclusive, invalid) protocol. For example, the components can include agents that are connected to one another using TileLink, a chip-scale interconnect standard that provides multiple clients with coherent memory mapped access to memory and/or server devices.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 7 is a flow chart of an example of a technique for passing messages between agents.

DETAILED DESCRIPTION

Figure 1:
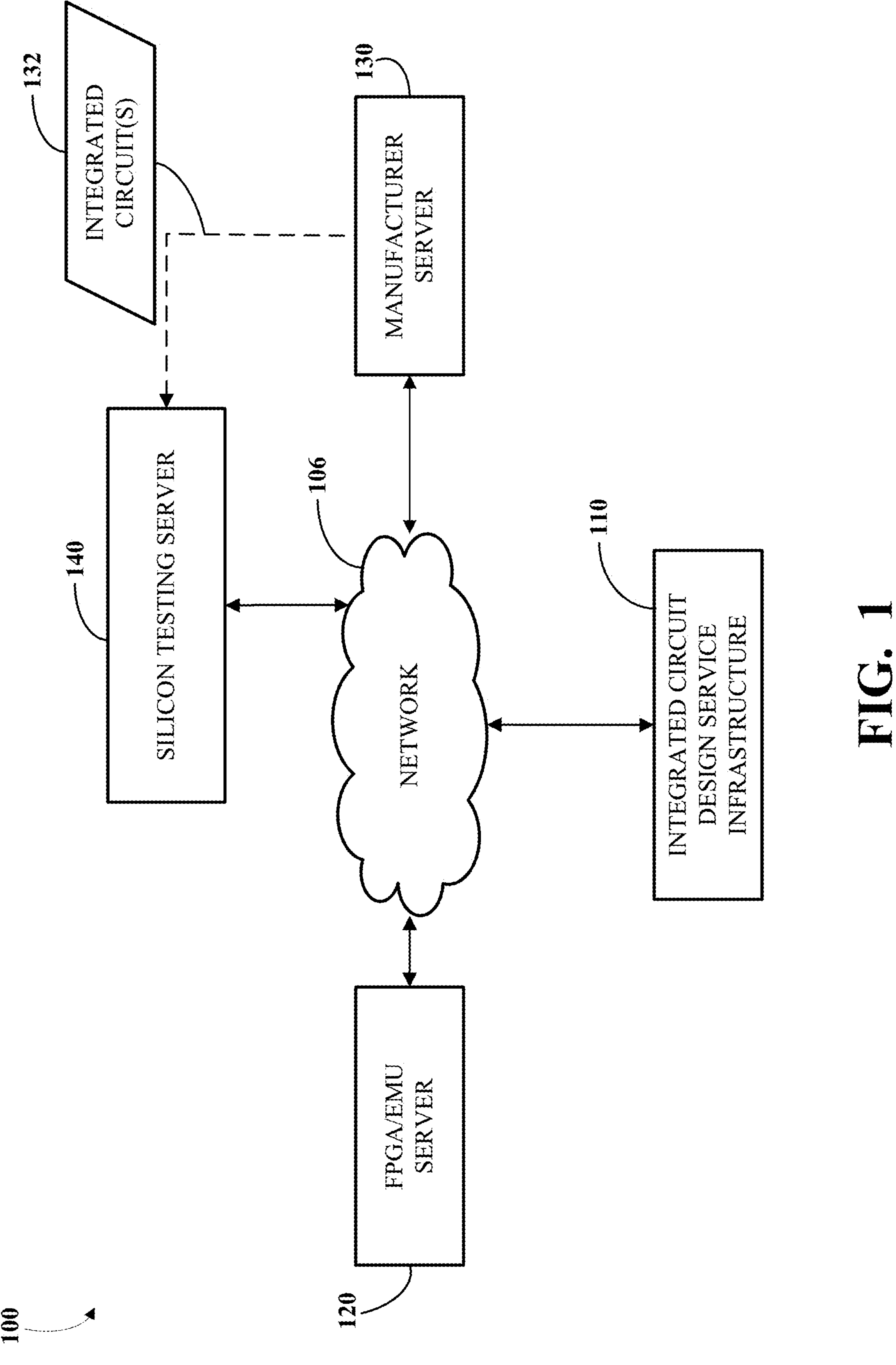
FIG. 1 is a block diagram of an example of a system for facilitating generation and manufacture of integrated circuits.

Disclosed herein are systems and methods for concurrent support for multiple cache inclusivity schemes using low priority evict operations. For example, Chip-Multiprocessor (CMP) architectures usually have multi-level cache hierarchies. A processor core may contain L1 Data Cache and private or shared L2 Cache. The next level is L3 cache. For L3 cache, there are many choices for inclusion policy, such as, inclusive, exclusive, or non-inclusive. Each inclusion policy has different pros and cons. An inclusion policy may be chosen based on system requirements. An inclusive cache can effectively handle snoop filtering but suffers from high space usage, since it needs to duplicate data of the lower cache. Some implementations described herein include an extensible Cache (EC), which addresses the reduced space issue of the inclusive cache while maintaining support for snoop filtering. Some implementations include a Non-Inclusive Cache Inclusive Directory (NICID) architecture for a cache.

Some implementations include a shared cache (e.g., an L2 cache or an L3 cache) that is configured to be non-inclusive (e.g., exclusive) of a first inner cache and to be inclusive of a second inner cache. These multiple cache inclusivity schemes may be enabled by the shared cache converting the eviction messages from the second inner cache having the higher priority to eviction messages having the lower priority as they propagate out toward memory in a cache hierarchy. When a high priority eviction message is received from the second inner cache, the shared cache may store the cached data being evicted locally in a set of buffers that the shared cache maintains, enabling it to continue the eviction operation by sending a low priority evict message to an outer memory system (e.g., to an outer cache or a memory controller). These eviction messages may be received and sent via buses that connect the shared cache to other caches in the cache hierarchy.

In an SoC, agents implemented by components, such as processor cores, caches, cross bars, memory controllers, and memory-mapped devices, may communicate with one another while adhering to a cache coherence policy (e.g., one of the MSI, MESI, or MOESI policies). For example, the agents may communicate with one another by initiating operations transmitted through a communications link, such as to fill (e.g., acquire), probe, or evict data stored in cache blocks. A cache block may include a contiguous set of memory addresses for which an agent can track cached copies of associated memory data. Thus, an agent may include logic that enables access to shared address space by communicating messages.

An agent may evict data by invoking an eviction operation. An eviction operation involves the removal of a cache block from a cache maintained by the agent. When the agent evicts the cache block, the agent voluntarily reduces its permissions (e.g., read and/or write access) associated with the cache block. For example, an agent may evict a cache block to make room for another cache block (e.g., to increase permissions for a different cache block), to transfer the cache block to another agent, or to release the cache block when powering down the cache. If a cache block is in a dirty state (e.g., the cache block has a copy of data that is more up to date than a copy contained in a higher level cache or memory), the eviction operation may involve the agent transmitting their copy of the cache block to an outer agent (e.g., the higher level cache, such as a shared cache or a last level cache). An agent may invoke an eviction operation, for example, by transmitting an eviction message to the outer agent.

An agent may probe data by invoking a probe operation. A probe operation may involve a request, from one agent to one or more other agents, associated with a cache block at an address. When an agent transmits a probe, the agent may seek to increase their permissions associated with a cache block and/or to obtain a copy of the cache block. When an agent receives a probe for a cache block that the agent has stored in its cache, the agent may change permissions associated with the cache block and/or transmit a copy of the cache block to the agent that transmitted the probe. An agent may invoke a probe operation, for example, by transmitting a probe message to another agent. While an eviction operation may be directed from an inner agent to an outer agent, a probe operation may be directed from the outer agent to the inner agent.

An eviction operation and a probe operation can sometimes overlap. For example, after a first agent that is an inner agent (e.g., inner relative to the cache hierarchy, such as a first processor core having a private cache) transmits an eviction message to a second agent that is an outer agent (e.g., the higher level cache, such as the shared cache or the last level cache) to evict a cache block at an address, a second agent that is an outer agent (e.g., the higher level cache) might send a probe message to probe the address associated with the cache block before the eviction operation completes. In another example, after the second agent transmits a probe message to probe the address associated with the cache block, the first agent might send an eviction message to evict the cache block at an address before the probe operation completes. To ensure cache coherence is maintained, and to avoid a concurrency issue or potential data hazard, the system may globally prioritize one operation over another. For example, the system may prioritize eviction operations so that probe operations are suspended when the eviction and probe operations overlap, or may prioritize probe operations so that eviction operations are suspended when the eviction and probe operations overlap. However, this may prevent different components in a system that apply different prioritizations from being used together. For example, if a first agent implemented by a first component is configured to prioritize eviction operations while a second agent implemented by a second component is configured to prioritize probe operations, the components may be incompatible with one another due to the possible concurrency issue or data hazard that could result from their interoperation.

Implementations of this disclosure address problems such as these by implementing an agent including agent circuitry that enables two messages at two priorities. The messages may include: (1) a first type of eviction message having a lower priority than probe messages (e.g., a low priority evict, or "Evict"); and (2) a second type of eviction message having a higher priority than probe messages (e.g., a high priority evict, or "InclEvict"). The eviction message having the lower priority (e.g., the low priority evict) may invoke a first eviction operation that is interruptible by probe operations. The eviction message having the higher priority (e.g., the high priority evict) may invoke a second eviction operation in which probe operations are interruptible by the second eviction operation. The eviction message having the lower priority may also have a lower priority than the eviction message having the higher priority, and the eviction message having the higher priority may have a higher priority than the eviction message having the lower priority. This may enable supporting interoperability of agents that implement different policies with respect to prioritizations of evicts and probes (e.g., when eviction and probe operations overlap).

In some implementations, the agent circuitry may send eviction messages having the higher priority through a first channel that is prioritized above a second channel for sending probe messages (e.g., the high priority evict can preempt the probe, based on an order of the channels). The first channel may also be prioritized above a third channel for sending eviction messages having the lower priority (e.g., the high priority evict can preempt the low priority evict, based on the order of the channels).

In some implementations, the agent circuitry may convert one or more eviction messages having the higher priority to one or more corresponding eviction messages having the lower priority, such as by maintaining a data storage that is inclusive of cache blocks being evicted, and by preventing cache blocks being evicted, that are also being probed, from transitioning from a modified state (e.g., "M" in the MOESI protocol) to an exclusive state (e.g., "E" in the MOESI protocol). In some implementations, the system (e.g., including the agent circuitry) may allow only one unacknowledged M to E transition to be in flight at a time. Further, in some implementations, the system may prevent M to E transitions on probes. As a result, agents that implement different policies with respect to prioritizations of evicts and probes, which may be implemented by components such as processor cores, caches, cross bars, memory controllers, and memory-mapped devices, may be used in a same system such as an SoC.

Some implementations may provide advantages over conventional cache architectures, such as, for example, achieving the benefits of cache inclusivity for a subset of processor cores or other agents in an SoC with reduced circuit complexity, area, or power consumption; and/or increasing the speed/performance of a memory system in an SoC in some conditions.

As used herein, the term "circuitry" refers to an arrangement of electronic components (e.g., transistors, resistors, capacitors, and/or inductors) that is structured to implement one or more functions. For example, a circuitry may include one or more transistors interconnected to form logic gates that collectively implement a logical function.

To describe some implementations in greater detail, reference is first made to examples of hardware and software structures used to implement a system including components that may invoke eviction operations based on eviction message types. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 3-5 and FIG. 13.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
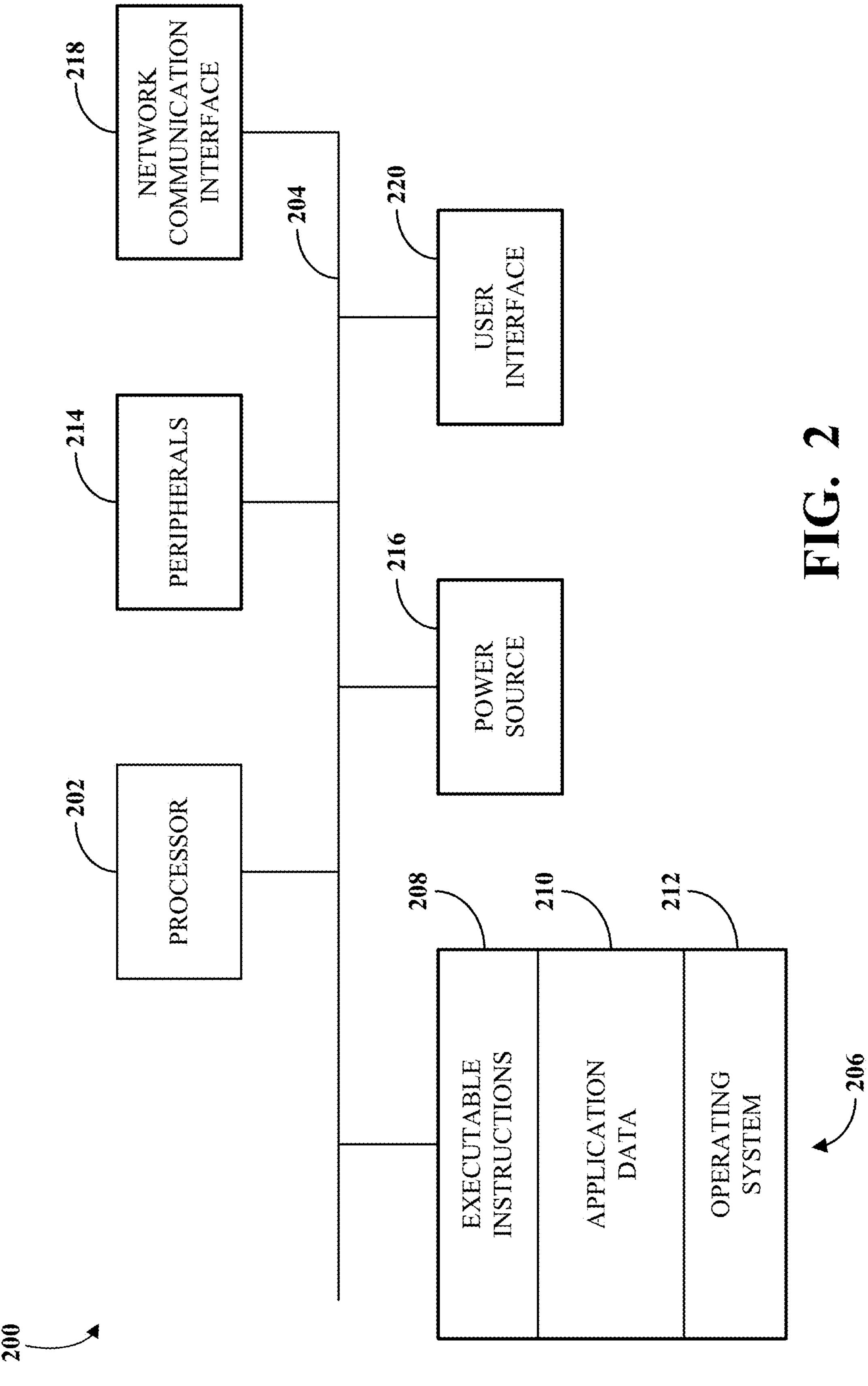
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 3-5 and FIG. 13.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
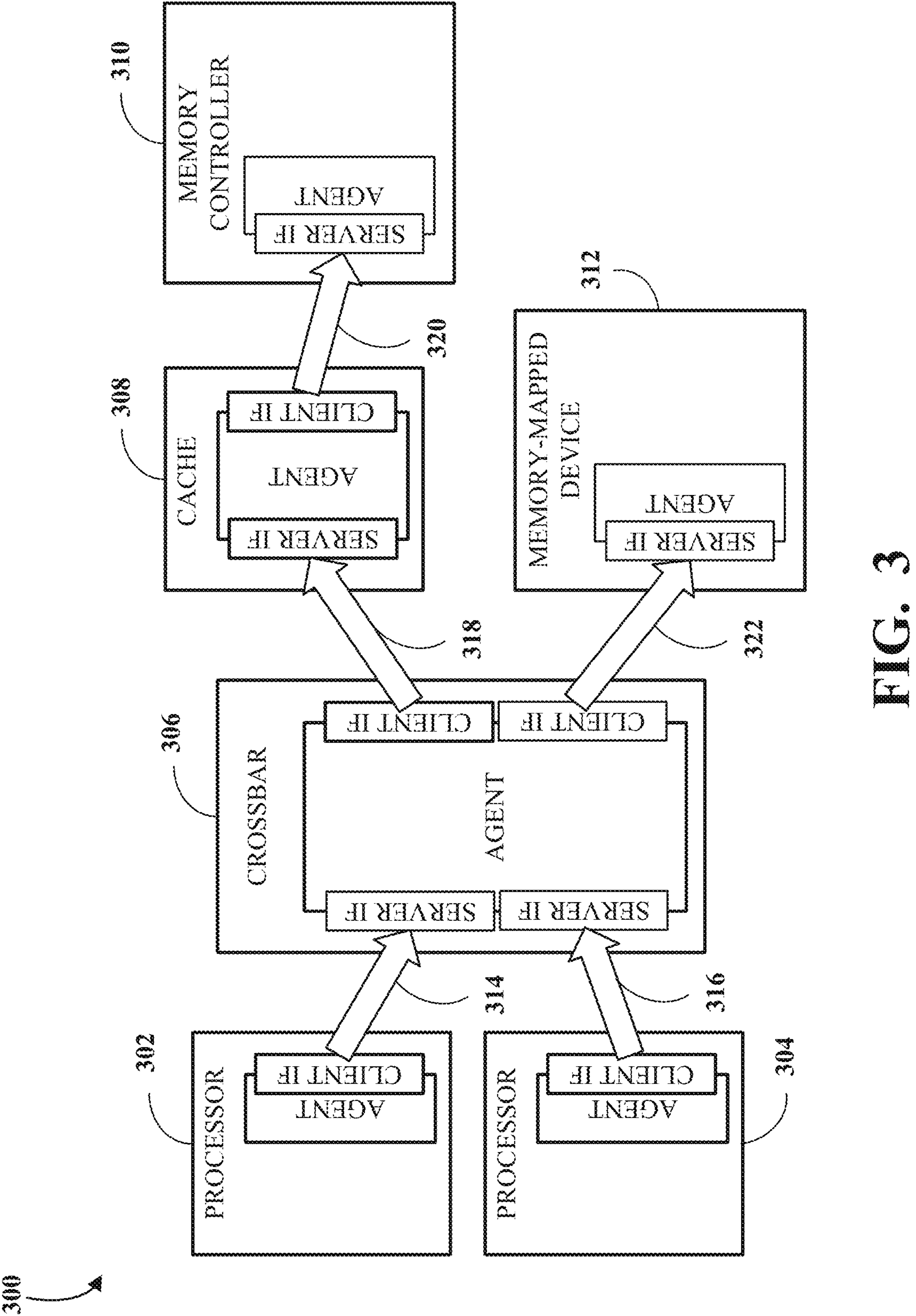
FIG. 3 is a block diagram of an example of a system including components that may invoke eviction operations based on eviction message types.

FIG. 3 is a block diagram of an example of a system 300 including components that may invoke eviction operations based on eviction message types. The system 300 could be implemented, for example, by an SoC. The components may include, for example, a first processor core 302 (e.g., which may include a private cache, implementing a data storage such as an SRAM), a second processor core 304 (e.g., which may include another private cache, implementing another data storage such as another SRAM), a cross bar 306, a cache 308 (e.g., a shared cache, implementing another data storage such as another SRAM), a memory controller 310 (e.g., a memory, implementing a data storage such as a DRAM), and a memory-mapped device 312. The components may be connected so that data stored in cache blocks can be transferred between them while adhering to a cache coherence policy, such as one of the MSI, MESI, or MOESI policies. For example, the components can include agents that are connected to one another so that messages involving data can be transferred between them (e.g., sending and receiving) while adhering to the cache coherence policy. For example, the agents may be connected to one another using TileLink, a chip-scale interconnect standard that provides multiple masters with coherent memory mapped access to memory and/or server devices.

The agents implemented by the components may implement point-to-point links for communicating the messages to one another. The messages may include, for example, messages associated with requests (e.g., requests for data, evictions of data, and probes for data), responses (e.g., transferring data), and acknowledgements. An agent may implement one or more client interfaces and/or one or more server interfaces for communicating the messages. An agent with a client interface (e.g., a client agent) may request an agent with a server interface (e.g., a sever agent) to perform memory operations, or may request permission to transfer and cache copies of data. An agent with a server interface may manage permissions and access to a range of addresses, including performing memory operations on behalf of requests arriving from a client interface. Thus, connected agents may send and receive messages over links to perform operations on shared address space, such as fill operations, probe operations, and evict operations.

For example, in the system 300, the first processor core 302 and the second processor core 304 may each include an agent having a client interface. The cross bar 306 may include an agent having a first server interface, a second server interface, a first client interface, and a second client interface (e.g., the cross bar 306 may be a server and a client, or servent). The client interface of the first processor core 302 may connect to the first server interface of the cross bar 306 by a link 314. The client interface of the second processor core 304 may connect to the second server interface of the cross bar 306 by a link 316. The cache 308 may include an agent having a server interface and a client interface (e.g., the cache 308 may also be a servent). The first client interface of the cross bar 306 may connect to the server interface of the cache 308 by a link 318. The memory controller 310 may include an agent having a server interface. The client interface of the cache 308 may connect to the server interface of the memory controller 310 by a link 320. The memory-mapped device 312 may include an agent having a server interface. The second client interface of the cross bar 306 may connect to the server interface of the memory-mapped device 312 by a link 322. The agents implemented by the first processor core 302, the second processor core 304, the cross bar 306, the cache 308, the memory controller 310, and the memory-mapped device 312, may send and receive messages over their respective links (e.g., the links 314, 316, 318, 320, and 322) to perform operations on shared address space.

Figure 4:
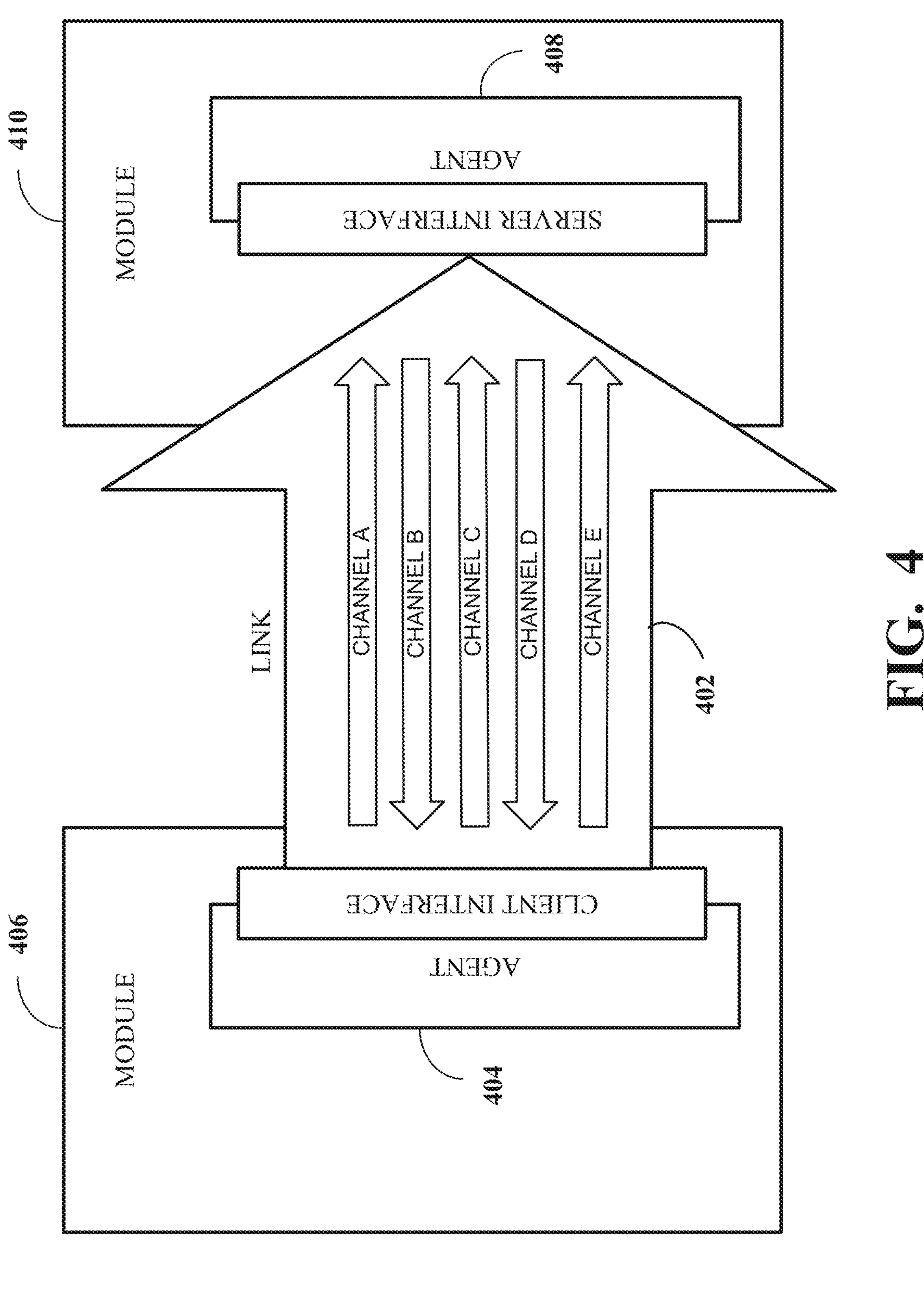
FIG. 4 is a block diagram of an example of a link between agents implemented by components.

FIG. 4 is a block diagram of an example of a link 402 between agents implemented by components in a system 400, such as an agent 404 implemented by a first component 406 and an agent 408 implemented by a second component 410. For example, the link 402 could be one of the links, 314, 316, 318, 320, or 322 shown in FIG. 3. The link 402 may be used to invoke eviction operations based on eviction message types.

The agent 404 implemented by the first component 406 may include a client interface (e.g., the agent 404 may be a client agent that is also an inner agent), and the agent 408 implemented by the second component 410 may include a server interface (e.g., the agent 408 may be a server agent that is also an outer agent). For example, the first component 406 could be the first processor core 302, and the second component 410 could be the cross bar 306, the cache 308, or the memory controller 310. The client interface of the agent 404 may connect to the server interface of the agent 408 by the link 402. The connected agents 404 and 408 may send and receive messages to one another over point-to-point channels of the link 402, such as one of the Channel A through E implemented by the link 402. For example, the agents 404 and 408 may send and receive messages to perform operations on a shared address space, such as fill operations, probe operations, and evict operations. An operation may include, for example, a change to an address range's data values, permissions, or location in a memory hierarchy. A message may include a set of control and data values sent over a particular channel (e.g., one of the Channel A through E). The channels may be logically independent from one another for communicating the messages. A priority may be specified among the channels, such as a prioritization in which messages on Channel A have a lowest priority with messages on Channel E having a highest priority (e.g., a prioritization of Channels A<B<C<D<E for messages across the channels). The channels may contain transaction control signals and a bus for exchanging data (e.g., a physical bus implemented by wires and having a particular data width, such as 128 bits). The channels may be directional, in that each channel may pass messages either from a client interface to a server interface or from a server interface to a client interface.

For example, Channel A may enable the agent having the client interface (e.g., the agent 404) to transmit a request to the agent having the server interface (e.g., the agent 408), such as a request that an operation be performed on a specified address range, such as accessing or caching data, or evicting data with a lower priority (e.g., a low priority evict). Channel B may enable the agent having the server interface (e.g., the agent 408) to transmit a request to the agent having the client interface (e.g., the agent 404), such as a request that an operation be performed at an address cached by a client (e.g., the agent 404), such as for accessing or writing back cached data or probing cached data at an address (e.g., a probe). Channel C may enable the agent having the client interface (e.g., the agent 404) to transmit to the agent having the server interface (e.g., the agent 408) data, an acknowledgment message in response to the request, or evicting data with a higher priority (e.g., a high priority evict). Channel D may enable the agent having the server interface (e.g., the agent 408) to transmit a data response or acknowledgement message back to the client (e.g., the agent 404). Channel E may enable the agent having the client interface (e.g., the agent 404) to transmit back to the agent having the server interface (e.g., the agent 408) a final acknowledgment of a cache line or block transfer from the requestor (e.g., the agent 404).

Figure 5:
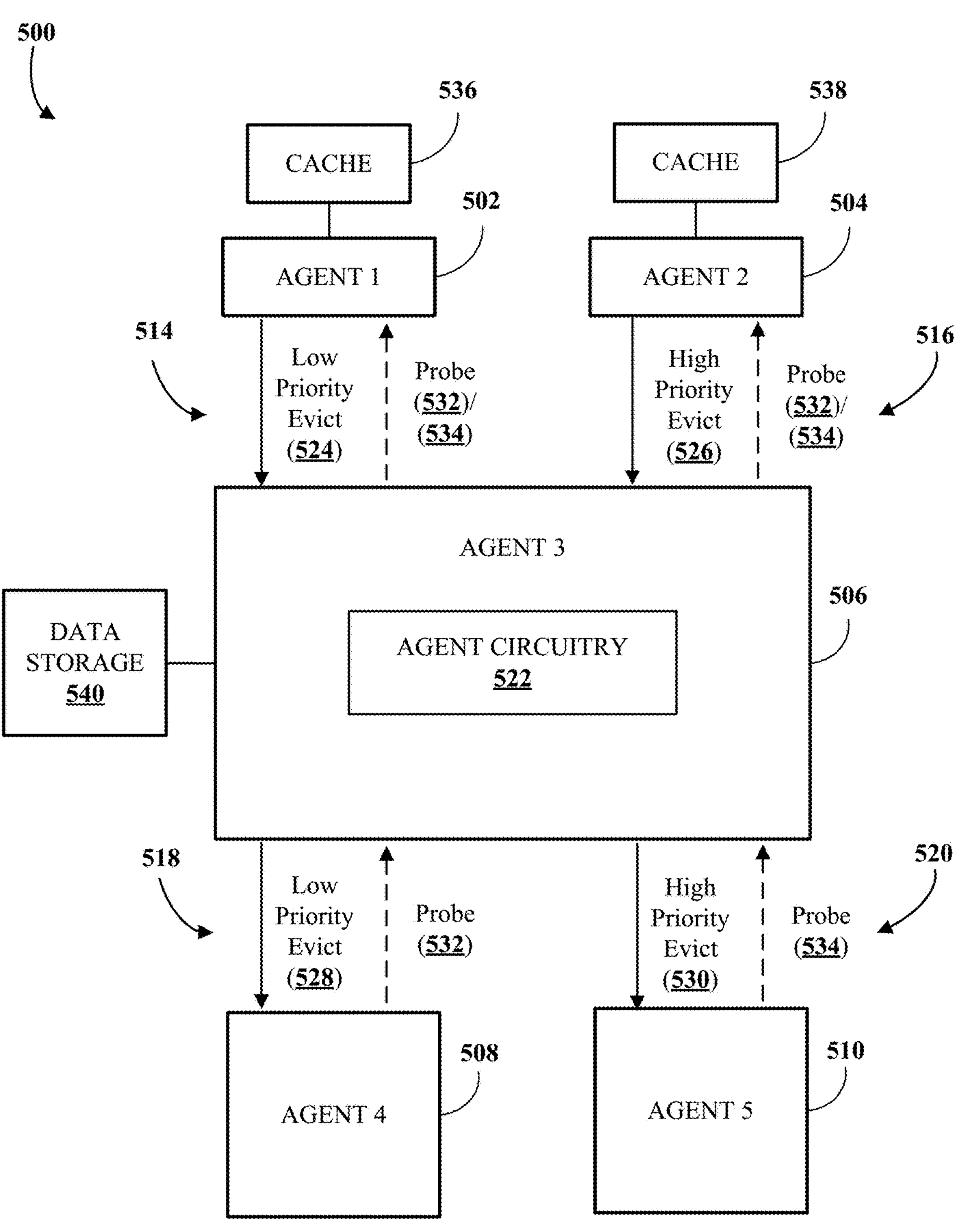
FIG. 5 is a block diagram of an example of a system including an agent that invokes eviction operations based on eviction message types.

FIG. 5 is a block diagram of an example of a system 500 including agents 502, 504, 506, 508, and 510. The agents 502, 504, 506, 508, and 510 could be agents like the agents shown in FIG. 3. For example, the agent 502 could be implemented by the first processor core 302, the agent 504 could be implemented by the second processor core 304 (e.g., which may have an architecture that implements a different policy with respect to prioritization of evicts and probes than the first processor core) or by another component such as a graphics accelerator, the agent 506 could be implemented by the cross bar 306 or by another component such as an interconnect, the agent 508 could be implemented by the cache 308, and the agent 510 could be implemented by another cache (e.g., which may have an architecture that implements a different policy with respect to prioritization of evicts and probes than the cache 308). The agents 502, 504, 506, 508, and 510 may each include circuitry for communicating with one another through a link. For example, the agents 502 and 506 could communicate with one another through a link 514 (e.g., which could be like the link 314), the agents 504 and 506 could communicate with one another through a link 516 (e.g., which could be like the link 316), the agents 506 and 508 could communicate with one another through a link 518 (e.g., which could be like the link 318), and the agents 506 and 510 could communicate with one another through a link 520 (e.g., which could be like the link 322). The links 514, 516, 518, and 520 may be like the link 402 shown in FIG. 4. The agents 502, 504, 506, 508, and 510 could be implemented together in an integrated circuit, such as an SoC.

The agent 506 may include agent circuitry 522 that is configured to invoke eviction operations based on eviction message types. The agent circuitry 522 may enable two messages at two priorities. The messages may include: (1) a first type of eviction message having a lower priority than probe messages (e.g., a low priority evict 524, such as that emitted by the agent 502, and a low priority evict 528, such as that emitted by the agent 506, each referred to as an "Evict"); and (2) a second type of eviction message having a higher priority than probe messages (e.g., a high priority evict 526, such as that emitted by the agent 504, and a high priority evict 530, such as that emitted by the agent 506, each referred to as an "InclEvict").

The eviction message having the lower priority (e.g., the low priority evict 524 and the low priority evict 528) may invoke a first eviction operation that is interruptible by probe operations (e.g., a probe 532, such as that emitted by the agent 508, or a probe 534, such as that emitted by the agent 510). A probe operation may cause the first eviction operation to be suspended until the probe operation completes.

The eviction message having the higher priority (e.g., the high priority evict 526 and the high priority evict 530) may invoke a second eviction operation in which the probe operations (e.g., the probe 532 and the probe 534) are interruptible by the second eviction operation. The second eviction operation may cause the probe operation to be suspended until the second eviction operation completes.

Thus, the eviction message having the higher priority may preempt a probe, and a probe may preempt the eviction message having the lower priority. Further, the eviction message having the lower priority may have a lower priority than the eviction message having the higher priority, and the eviction message having the higher priority may have a higher priority than the eviction message having the lower priority. Thus, the eviction message having the higher priority may preempt the eviction message having the lower priority. As a result, the agent circuitry 522 may enable interoperability of agents (e.g., agents 502, 504, 508, and 510) that implement different policies with respect to prioritizations of evicts and probes (e.g., when eviction operations and probe operations overlap).

The agent circuitry 522 may be configured to pass messages between the agents 502, 504, 508, and 510. For example, the agent 502 may be configured to transmit eviction messages having the lower priority (e.g., the low priority evict 524, via the link 514), and the agent 504 may be configured to transmit eviction messages having the higher priority (e.g., the high priority evict 526, via the link 516). The agent 508 may be configured to receive eviction messages having the lower priority (e.g., the low priority evict 528, via the link 518), and the agent 510 may be configured to receive eviction messages having the higher priority (e.g., the high priority evict 530, via the link 520). The agent circuitry 522 may pass the low priority evict 524 from the agent 502, such as by sending the low priority evict 528 when the agent 502 evicts a cache block targeting the agent 508 and/or by converting the low priority evict 524 to the high priority evict 530 when the agent 502 evicts a cache block targeting the agent 510. The agent circuitry 522 may pass the high priority evict 526 from the agent 504, such as by converting the high priority evict 526 to the low priority evict 528 when the agent 504 evicts a cache block targeting the agent 508 and/or by sending the high priority evict 530 when the agent 504 evicts a cache block targeting the agent 510.

In some implementations, the agent 502 (e.g., which emits the low priority evict 524) may be associated with a cache 536, and the agent 504 (e.g., which emits the high priority evict 526) may be associated with a cache 538. For example, the cache 536 could be a private level two (L2) cache implemented by a first processor core, and the cache 538 could be a private L2 cache implemented by a second processor core (e.g., having an architecture that implements a different policy with respect to prioritization of evicts and probes than the first processor core). The agent 508 could be associated with a shared level three (L3) cache that is a higher level cache or last level cache used by the cache 536 and the cache 538. The agent circuitry 522 may maintain a data storage 540 (e.g., an additional, local cache). The data storage 540 may be inclusive of cache blocks stored in the cache 538 (e.g., associated with the agent 504 that emits the high priority evict 526) without being inclusive of cache blocks stored in the cache 536 (e.g., associated with the agent 504 that emits the low priority evict 524). This may enable the data storage 540 to have a reduced size. The data storage 540 may be inclusive of unique or dirty cache blocks stored in the cache 538 (e.g., the data storage 540 may be inclusive of all unique and all dirty cache blocks in the cache 538 maintained by the agent 504 that transmits the high priority evict 526) to avoid a possible concurrency issue or data hazard that could result from interoperation of the agents 504 and 508. For example, a dirty cache block may indicate that data in the cache block is more up to date than a copy of day contained in an outer cache (e.g., the cache 538). An agent (e.g., the agent 504) storing a dirty cache block will eventually write its copy of data back to the outer cache (e.g., the agent 508). A clean cache block may indicate the agent (e.g., the agent 504) has no responsibility to write the copy of data back to the outer cache (e.g., the agent 508) in the event of an eviction or probe operation.

When passing an eviction message having the higher priority from the cache 538 (e.g., the high priority evict 526, evicting a cache block), as an eviction message having the lower priority to the agent 508 (e.g., the low priority evict 528, evicting the same cache block), the agent circuitry 522 may access the data storage 540, such as for accessing the cache block to the extent it is unique or dirty. The agent circuitry 522 may use the data storage 540 to complete the high priority evict 526, including without waiting for the low priority evict 528 to progress or complete, thus allowing the priority between eviction and probe operations to be reversed on the link 518. The agent circuitry 522 can avoid maintaining the data storage 540 to be inclusive of other cache blocks granted to the cache 538, such as replicated and clean cache blocks (e.g., copies of data in cache blocks that are neither unique nor dirty, matching data in main memory). The agent circuitry 522 can also avoid maintaining the data storage 540 to be inclusive of cache blocks granted to the cache 536, based on the cache 536 emitting eviction messages having the lower priority (e.g., the low priority evict 524). The agent circuitry 522 can also avoid maintaining the data storage 540 to be inclusive of cache blocks granted to the cache 538 to the extent that such cache blocks are emitted to the agent 510 (e.g., configured to receive the high priority evict 530, similar to the high priority evict 526) as opposed to the agent 508 (e.g., such as when the eviction does not target the agent 508).

In some implementations, the agent circuitry 522 may prevent a cache block in the data storage 540, that is being evicted from the cache 538 (e.g., based on the inclusivity), and is also being probed, from transitioning from a modified state (e.g., "M" in the MOESI protocol) to an exclusive state (e.g., "E" in the MOESI protocol). For example, the MOESI protocol may include modified (M), owned (O), exclusive (E), shared(S), and invalid (I) states. In the M state, a unique copy of data in a cache block is dirty. An inner agent (e.g., the agent 504, including the cache 538) may hold permissions to sample and update the data in the cache block. The inner agent (e.g., the agent 504) is tracking a dirty copy of the data and is responsible for providing an up to date copy on an eviction (e.g., the high priority evict 526, directed to the agent 508). In the O state, a replicated copy of data in the cache block is dirty. The inner agent (e.g., the agent 504) may hold permission to sample the data in the cache block. The outer agent (e.g., the agent 508) may have provided copies of the cache block to other agents (e.g., the cache 536). The inner agent (e.g., the agent 504) is tracking a dirty copy of the data and is responsible for providing an up to date copy on an eviction (e.g., the high priority evict 526, directed to the agent 508). In the E state, unique copy of data in the cache block is clean. The inner agent (e.g., the agent 504) may hold permissions to sample and update the data in the cache block. The outer agent (e.g., the agent 508) has not provided any copies of the cache block to other agents (e.g., the agent 502, including the cache 536). If the inner agent (e.g., the agent 504) has a copy of the data, the data is clean. The inner agent (e.g., the agent 504) may or may not be requested to provide data on an eviction (e.g., the high priority evict 526, directed to the agent 508). In the S state, a replicated copy of the data in the cache block is clean. The inner agent (e.g., the agent 504) may hold permission to sample the data in the cache block. The outer agent (e.g., the agent 508) may have provided copies of the cache block to other agents (e.g., the agent 502). If the inner agent (e.g., the agent 504) has a copy of the data, the data in the cache block is clean. The inner agent (e.g., the agent 504) may or may not be requested to provide data on an eviction (e.g., the high priority evict 526, directed to the agent 508). In the I state, there is no copy of the data in the cache block. The inner agent (e.g., the agent 504) has no permissions to operate on the cache block. The status of the cache block is not presently tracked by the inner agent (e.g., the agent 504) and inner agent (e.g., the agent 504) cannot supply a copy of the data in the cache block.

The agent circuitry 522 may prevent a cache block being evicted (e.g., by the agent 504, from the cache 538, to the agent 508), and also being probed (e.g., by the agent 508 or the agent 510), from transitioning from the M state to the E state when passing an eviction message having the higher priority (e.g., the high priority evict 526) as an eviction message having the lower priority (e.g., the low priority evict 528, such as when converting from the second eviction operation to the first eviction operation). This may differ from other evictions, such as when passing an eviction message having the lower priority (e.g., the low priority evict 524, from the agent 502) as another eviction message having the lower priority (e.g., the low priority evict 528) or as an eviction message having the higher priority (e.g., the high priority evict 530), or when passing an eviction message having the higher priority (e.g., the high priority evict 526) as another eviction message having the higher priority (e.g., the high priority evict 530, to the agent 510).

Thus, the agent circuitry 522 may convert eviction messages having the higher priority (e.g., the high priority evict 526) to eviction messages having the lower priority (e.g., the low priority evict 528). The agent circuitry 522 may convert the eviction message from the higher priority to the lower priority when a cache block being evicted with a higher priority is targeting an agent that is configured to receive evictions at a lower priority (e.g., the agent 508). For example, the agent circuitry 522 may maintain the data storage 540 to be inclusive of cache blocks that are being evicted from the cache 538 (e.g., associated with the agent 504 that emits eviction messages at the higher priority). The agent circuitry 522 may also prevent cache blocks that are being evicted from the cache 538, when being probed, from transitioning from a modified state to an exclusive state. This may enable the agent circuitry 522, for example, to pass an eviction message having the lower priority to the agent 508 when receiving an eviction message having the higher priority from the agent 504. The agent circuitry 522 may also convert eviction messages having the lower priority (e.g., the low priority evict 524) to eviction messages having the higher priority (e.g., the high priority evict 530). The agent circuitry 522 may convert the eviction message from the lower priority to the higher priority when a cache block being evicted with a lower priority is targeting an agent that is configured to receive evictions at a higher priority (e.g., the agent 510). In such cases, the agent circuitry 522, for example, may pass an eviction message having the higher priority to the agent 510 when receiving an eviction message having the lower priority from the agent 502. As a result, agents (e.g., the agents 502, 504, 506, and 508) that implement different policies with respect to prioritizations of evicts and probes, implemented by components such as processor cores, caches, cross bars, memory controllers, and memory-mapped devices, may be used in a same system, such as an SoC.

In some implementations, the agent circuitry 522 may send eviction messages having the higher priority (e.g., the high priority evict 526, and the high priority evict 530) through a first channel (e.g., Channel C, described in the link 402 shown in FIG. 4). The first channel may be prioritized above a second channel (e.g., Channel B, described in the link 402 shown in FIG. 4) for sending probe messages (e.g., the probe 532 or the probe 534). The first channel may also be prioritized above a third channel (e.g., Channel A, described in the link 402 shown in FIG. 4) for sending eviction messages having the lower priority (e.g., the low priority evict 524 and the low priority evict 528). Thus, on a given link (e.g., any of the links 514, 516, 518, and 520) the high priority evict can preempt the probe and the low priority evict when the high priority evict is transmitted, and the probe can preempt the low priority evict when the low priority evict is transmitted.

Figure 6:
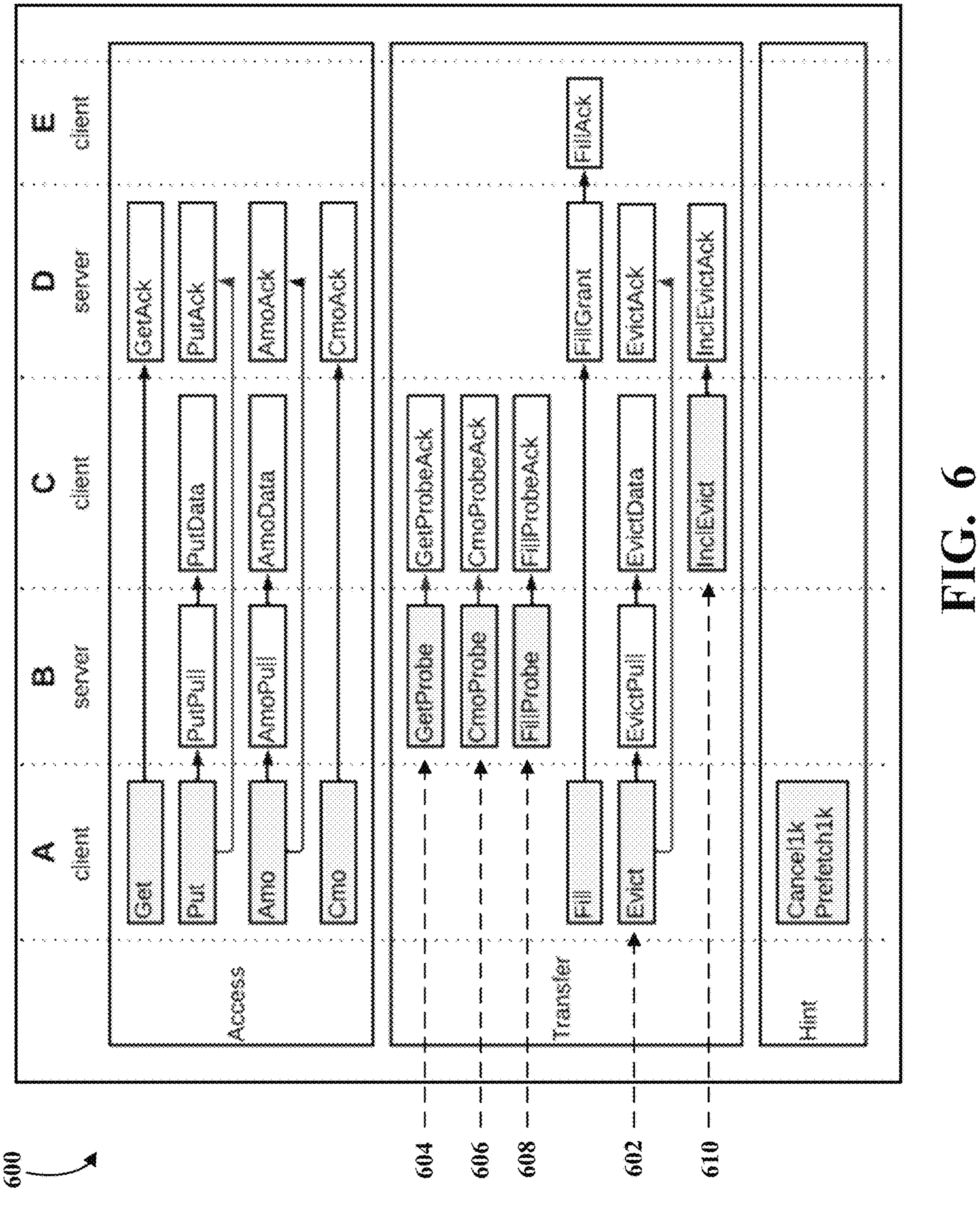
FIG. 6 is a diagram of an example of messages that may be communicated between agents.

FIG. 6 is a diagram 600 of an example of messages that may be communicated between agents. The messages may be communicated through a link, such as any of the links 314, 316, 318, 320, and 322 shown in FIG. 3, the link 402 shown in FIG. 4, and any of the links 514, 516, 518, and 520 shown in FIG. 5. The messages may be communicated between agents having client interfaces and server interfaces, such as agents implemented by the first processor core 302, the second processor core 304, the cross bar 306, the cache 308, the memory controller 310, and the memory-mapped device 312 shown in FIG. 3, agents implemented by the components 406 and 410 shown in FIG. 4, and the agents 502, 504, 506, 508, and 510 shown in FIG. 5.

The messages may be communicated through channels associated with priorities, such as the Channels A, B, C, D, and E shown in columns, having prioritization of Channels A<B<C<D<E for messages across the channels, as shown in FIG. 4. For example, an agent having a client interface (e.g., a client agent) may send a message having a lowest priority via Channel A. An agent having a server interface (e.g., a server agent) may send a message having a next lowest priority via Channel B (e.g., having a higher priority than Channel A). The agent having the client interface (e.g., the client agent) may send a message having a next lowest priority via Channel C (e.g., having a higher priority than Channels A and B). The agent having the server interface (e.g., the server agent) may send a message having a next lowest priority via Channel D (e.g., having a higher priority than Channels A, B, and C). The agent having the client interface (e.g., the client agent) may send a message having a highest priority via Channel E (e.g., having a higher priority than Channels A, B, C, and D). Some agents may have both a client interface and a server interface and therefore may function as a server at times and a client at times (e.g., the agent may be a servent, such as the agent 506 shown in FIG. 5).

A box in a column of the diagram 600 may indicate a possible message sent by an agent through a channel corresponding to the column including the box. For example, the box labeled "Evict" may indicate a first type of eviction message having a lower priority than probe messages (e.g., the low priority evict 524 and the low priority evict 528) that may be sent by a client agent (e.g., the agent 502 and the agent 506) via Channel A. The boxes labeled "GetProbe," "CmoProbe," and "FillProbe" may indicate types of probe messages (e.g., the probe 532 and the probe 534) that may be sent by a server agent (e.g., the agent 508 and the agent 510) via Channel B. A box labeled "InclEvict" may indicate a second type of eviction message having a higher priority than probe messages (e.g., the high priority evict 526 and the high priority evict 530) that may be sent by a client agent (e.g., the agent 502 and the agent 506) via Channel C.

A series of boxes in columns of the diagram 600 may indicate a possible operation between agents, comprising a sequence of multiple messages, communicated through a given link using multiple channels. For example, a first eviction operation 602 that is interruptible by probe operations (e.g., a probe operation may cause the first eviction operation 602 to be suspended until the probe operation completes) may include a sequence of messages including "Evict," "EvictPull," "EvictData," and "EvictAck." The first eviction operation 602 may be initiated or invoked by a client agent sending the "Evict" message through Channel A (e.g., having a lower priority than the probe messages). The "Evict" message may include the address and the size of the cache block to be evicted. The server agent may respond by sending the "EvictPull" message through Channel B indicating that the server agent is ready to complete the exchange. The client agent may respond to the "EvictPull" message with an "EvictData" message through Channel C which transfers permissions and/or data associated with the cache block. The server agent may respond with an "EvictAck" message through Channel D releasing the address hazard. The server agent may or may not wait for the "EvictData" message before it issues an "EvictAck" message. The first eviction operation 602 may be interruptible by any of probe operations 604, 606, or 608 targeting the same address of the cache block based on the higher priority of the probe messages (e.g., higher priority than the "Evict" message through Channel A) associated with the probe operations.

In another example, a second eviction operation 610 in which probe operations are interruptible by the second eviction operation 610 may include a sequence of messages including "InclEvict" and "InclEvictAck." The second eviction operation 610 may be initiated or invoked by a client agent sending the "InclEvict" message through Channel C (e.g., having a higher priority than the probe messages). The "InclEvict" message may include the address and size of the cache block to be evicted, the initial state of the cache block, the final state of the cache block, and whether the message includes data. If a state transitions from dirty to clean or invalid, the client agent sends data associated with the cache block with the "InclEvict" message. The server agent may respond with an "InclEvictAck" message through Channel D indicating that the "InclEvict" has been accepted at the server agent. The second eviction operation 610 may be like the first eviction operation 602, except the second eviction operation 610 cannot be interrupted by any of probe operations 604, 606, or 608 targeting the same address of the cache block, based on the lower priority of the probe messages (e.g., lower priority than the "InclEvict" message through Channel C) associated with the probe operations. The second eviction operation 610 may decrease the permissions a client agent may have on a cache block. The second eviction operation 610 may move data from the client agent to the server agent. A client agent may use the second eviction operation 610 when an agent (e.g., the agent 506) also holds permissions and/or data for the cache block being evicted (e.g., the agent 506 is inclusive of the cache block, via the data storage 540).

To further describe some implementations in greater detail, reference is next made to examples of techniques for an agent to invoke eviction operations based on eviction message type. FIG. 7 is a flow chart of an example of a technique 700 for passing messages between agents. The technique 700 can be executed using computing devices, such as the systems, hardware, and software described with respect to FIGS. 1-6. For simplicity of explanation, the technique 700 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 702, a first agent, including first agent circuitry, may pass messages between a agents. For example, the agent 506, including the agent circuitry 522, may pass messages between the agents 502, 504, 508, and 510 shown in FIG. 5. The messages may include, for example, eviction messages (e.g., "Evict" and "InclEvict") and probe messages (e.g., "GetProbe," "CmoProbe," and "FillProbe"). At least one of the agents may be configured to transmit eviction messages having a lower priority than probe messages. For example, the agent 502 may be configured to transmit eviction messages having a lower priority than probe messages (e.g., the low priority evict 524). The eviction messages having the lower priority may be associated with a first eviction operations (e.g., the first eviction operation 602) that is interruptible by probe operations (and interruptible by eviction messages having a higher priority). At least one of the agents may be configured to transmit eviction messages having a higher priority than probe messages. For example, the agent 504 may be configured to transmit eviction messages having a higher priority than probe messages (e.g., the high priority evict 526). The eviction messages having the higher priority may be associated with a second eviction operation (e.g., the second eviction operation 610) in which probe operations are interruptible by the second eviction operation.

Further, at least one of the agents may be configured to receive the eviction messages having the lower priority than probe messages. For example, the agent 508 may be configured to receive the eviction messages having the lower priority than probe messages (e.g., the low priority evict 528). At least one of the agents may be configured to receive the eviction messages having the higher priority than probe messages. For example, the agent 510 may be configured to receive the eviction messages having the lower priority than probe messages (e.g., the high priority evict 530). As a result, the first agent may pass messages between agents, including probe messages, and two messages for evictions at two priorities relative to the probe messages.

Figure 8:
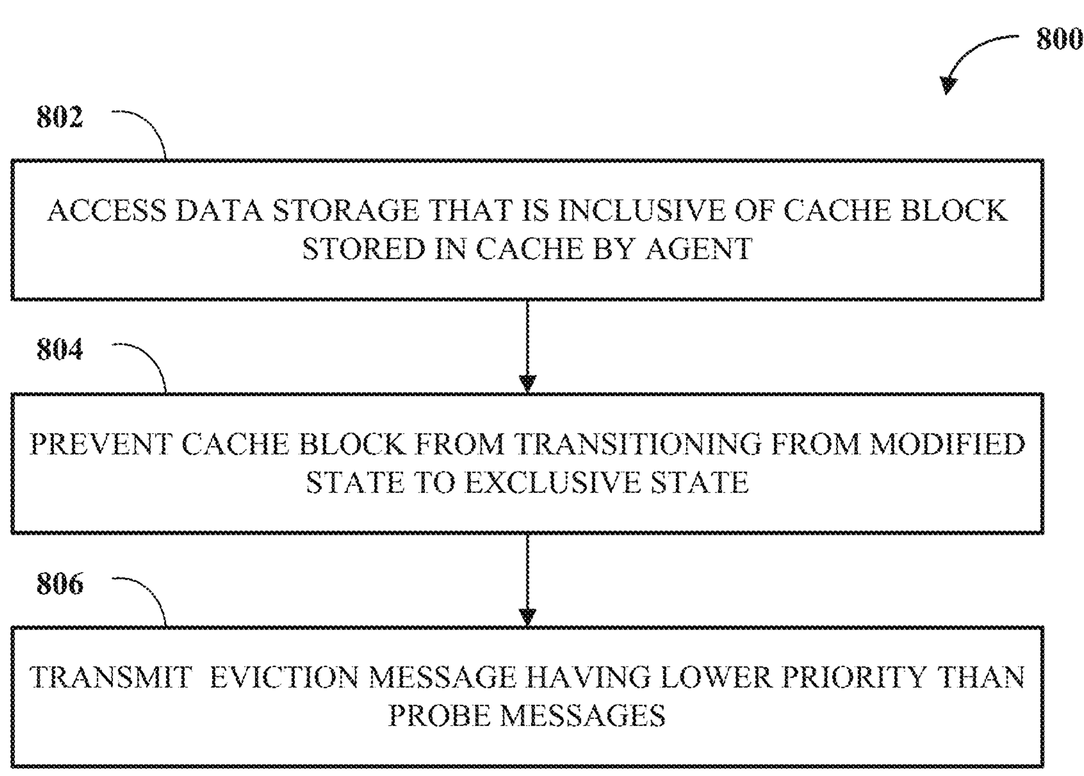
FIG. 8 is a flow chart of an example of a technique for converting eviction operations or messages.

FIG. 8 is a flow chart of an example of a technique 800 for converting eviction operations or messages. For example, a first agent (e.g., the agent 506, using the agent circuitry 522 and the data storage 540) may convert a second type of eviction message having a higher priority than probe messages (e.g., the high priority evict 526) to a first type of eviction message having a lower priority than probe messages (e.g., the low priority evict 524) using the technique 800. For example, in the technique 700, the first agent may convert the second type of eviction message to the first type of eviction message using the technique 800. For example, in the technique 700, the first agent may convert an "InclEvict" message, received through a first link, to an "Evict" message, transmitted through a second link, using the technique 800. The technique 800 can be executed using computing devices, such as the systems, hardware, and software described with respect to FIGS. 1-6. For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a first agent may access a data storage that is inclusive of a cache block stored in a cache by a second agent. The second agent may be an agent that transmits an eviction message having a higher priority than probe messages. For example, the agent 506 may access the data storage 540 that is inclusive of a cache block stored in the cache 538 by the agent 504. The agent 504 may transmits an eviction message having the higher priority (e.g., the high priority evict 526, such as the "InclEvict" message, through channel C of a first link, having a higher priority than the probe messages). The first agent may include agent circuitry (e.g., the agent circuitry 522) configured to maintain the data storage 540. The data storage 540 may be inclusive of unique or dirty cache blocks stored in the cache maintained by the second agent (e.g., the data storage may be inclusive of all unique and all dirty cache blocks in the cache maintained by the agent that transmits the second type of eviction message having the higher priority than probe messages), such as to enable completion of the high priority evict 526 from the agent 504 (e.g., an inner agent) without waiting for the low priority evict 528 to the agent 508 (e.g., an outer agent) to progress or complete (e.g., so that the first agent can deescalate the eviction priority relative to the probe). In other words, the data storage provides the first agent with the resources to locally complete the inner eviction (e.g., to locally complete the high priority evict 526 from the agent 504).

At 804, the first agent may prevent the cache block from transitioning from a modified state to an exclusive state. The first agent may prevent the cache block from transitioning from the modified state to the exclusive state when the address of the cache block is being probed. For example, the agent circuitry 522 may prevent the cache block being evicted by the agent (e.g., the agent 504, from the cache 538), and also being probed (e.g., by the agent 508), from transitioning from the M state to the E state when passing an eviction message having the higher priority (e.g., the high priority evict 526) as an eviction message having the lower priority (e.g., the low priority evict 528, such as when converting from the second eviction operation 610 to the first eviction operation 602). This may differ from other evictions, such as when passing an eviction message having the lower priority (e.g., the low priority evict 524) as another eviction message having the lower priority (e.g., the low priority evict 528) or as an eviction message having the higher priority (e.g., the high priority evict 530), or when passing an eviction message having the higher priority (e.g., the high priority evict 526) as another eviction message having the higher priority (e.g., the high priority evict 530).

At 806, the first agent may transmit an eviction message having a lower priority than the probe messages. For example, with the data storage 540, and the agent circuitry 522 preventing the cache block from transitioning from the modified state to the exclusive state, the first agent may transmit an eviction message having the lower priority (e.g., the low priority evict 524, such as the "Evict" message, through channel A of a second link, having a lower priority than the probe messages).

Figure 9:
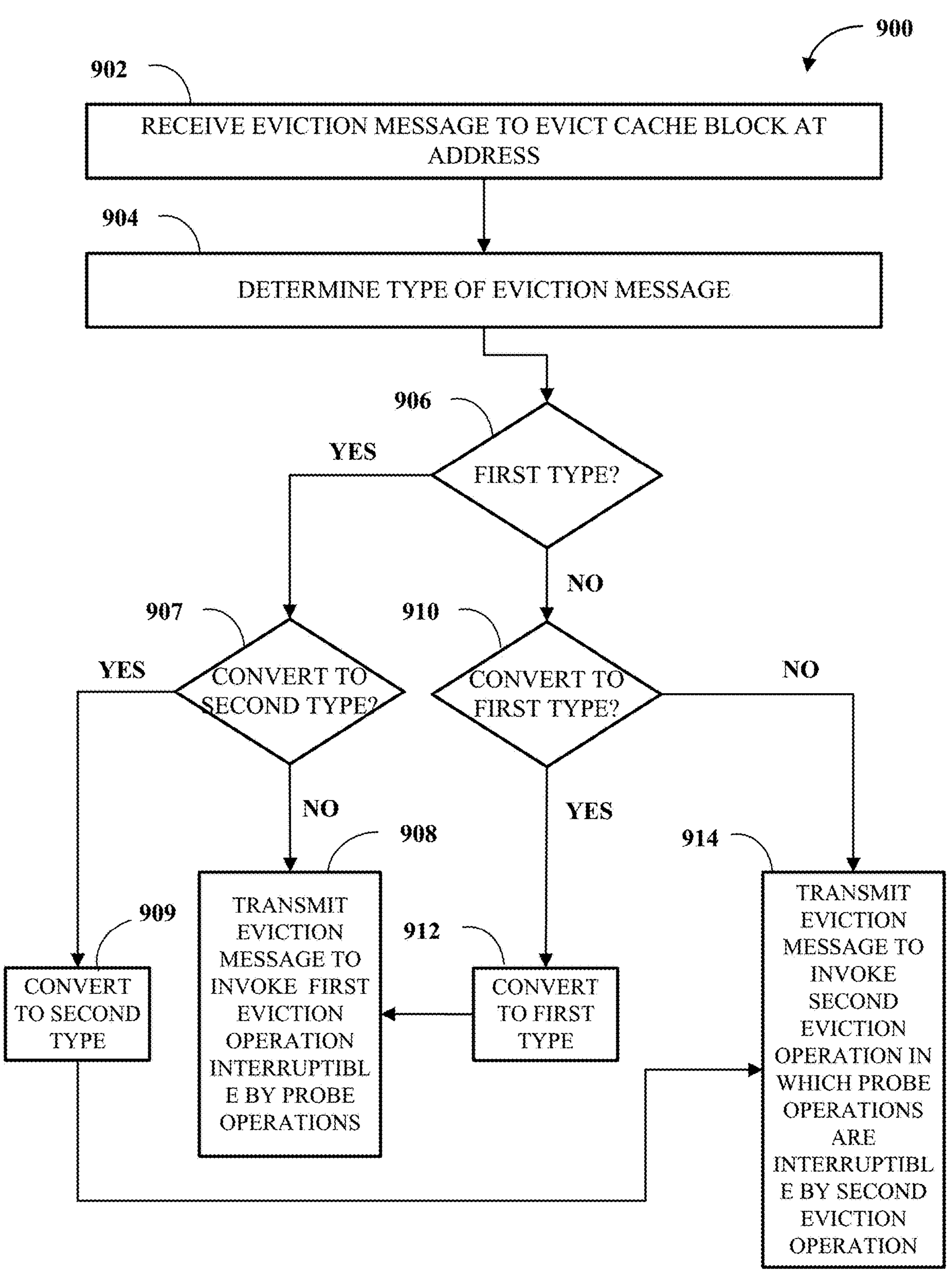
FIG. 9 is a flow chart of an example of a technique for an agent to invoke eviction operations based on an eviction message type.

FIG. 9 is a flow chart of an example of a technique 900 for an agent to invoke eviction operations based on an eviction message type. The technique 900 can be executed using computing devices, such as the systems, hardware, and software described with respect to FIGS. 1-6. For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, a first agent may receive an eviction message from a second agent to evict a cache block at an address. For example, the agent 506 may receive an eviction message, such as the low priority evict 524 or the high priority evict 526, from the agent 502 or the agent 504, to evict a cache block stored in a cache, such as the cache 536 or the cache 538 as shown in FIG. 5. The first agent may include agent circuitry (e.g., the agent circuitry 522) configured to receive the eviction message, such as through a prioritized channel (e.g., a lower prioritized Channel A for the low priority evict 524, or a higher prioritized Channel C for the high priority evict 526) implemented by a first link (e.g., the links 514 or 516) between the first agent and the second agent. The eviction message may include an address and a size of a cache block to be evicted.

At 904, the first agent may determine the type of eviction message that is received as either a first type of eviction message or a second type of eviction message. For example, the first agent may use the agent circuitry to detect the priority associated with eviction message, such as by detecting the channel on which the eviction message was sent. The first agent may determine the type of eviction message to be the first type of eviction message having a lower priority than probe messages (e.g., the low priority evict 524, such as an "Evict" message) when the eviction message is received through a lower prioritized channel (e.g., Channel A) of the first link. The first agent may determine the type of eviction message to be the second type of eviction message having a higher priority than probe messages (e.g., the high priority evict 526, such as an "InclEvict" message) when the eviction message is received through a higher prioritized channel (e.g., Channel C) of the first link.

At 906, if the first agent determines the type of eviction message to be the first type of eviction message ("Yes"), at 907 the first agent may then determine whether to convert the first type of eviction message to the second type of eviction message when receiving the first type of eviction message. The first agent may determine to convert the first type of eviction message based on the target of the eviction message, which may be determined by the address of the cache block being evicted. If the first agent determines to convert the first type of eviction message to the second type of eviction message ("Yes"), at 909 the first agent may carry out one or more steps to convert the first type of eviction message to the second type of eviction message when receiving the first type of eviction message (e.g., the first agent may convert from a first eviction operation to a second eviction operation when receiving the first type of eviction message). At 914, the first agent may transmit an eviction message to invoke a second eviction operation in which probe operations are interruptible by the second eviction operation (e.g., the second eviction operation 610, being the high priority evict). For example, the probe operations 604, 606, or 608, invoked by the probe 532 or the probe 534, may be interruptible by the second eviction operation. The second eviction operation may cause a probe operation to be suspended until the second eviction operation completes. The second eviction operation may be invoked by transmitting an eviction message having a higher priority than probe messages (e.g., the high priority evict 530). For example, the agent circuitry (e.g., the agent circuitry 522) may be configured to transmit the eviction message having the higher priority (e.g., the high priority evict 530), such as through a higher prioritized channel (e.g., Channel C) implemented by a third link (e.g., the link 520) between the first agent and a fourth agent (e.g., the agent 510) configured to receive eviction messages having the higher priority.

However, at 907, if the first agent determines not to convert the first type of eviction message to the second type of eviction message ("No"), at 908 the first agent may transmit an eviction message to invoke a first eviction operation that may be interruptible by probe operations (e.g., the first eviction operation 602, being a low priority evict, such as the low priority evict 528). For example, the first eviction operation may be interruptible by the probe operations 604, 606, or 608, invoked by the probe 532 or the probe 534. A probe operation may cause the first eviction operation to be suspended until the probe operation completes. The first eviction operation may be invoked by transmitting an eviction message having a lower priority than probe messages (e.g., the low priority evict 528). For example, the agent circuitry (e.g., the agent circuitry 522) may be configured to transmit the eviction message having the lower priority (e.g., the low priority evict 528), such as through a lower prioritized channel (e.g., Channel A) implemented by a second link (e.g., the link 518) between the first agent and a third agent (e.g., the agent 508) configured to receive eviction messages having the lower priority.

Returning to 906, if the first agent determines that the type of eviction message is not the first type of eviction message ("No"), but instead determines the type of eviction message to be the second type of eviction message, at 910 the first agent may then determine whether to convert the second type of eviction message to the first type of eviction message when receiving the second type of eviction message. The first agent may determine to convert the second type of eviction message based on the target of the eviction message, which may be determined by the address of the cache block being evicted. For example, the first agent may determine that the eviction message is targeting a third agent (e.g., the agent 508) configured to receive eviction messages having the lower priority, in which case the first agent may convert the second type of eviction message to the first type of eviction message. In another example, the first agent may determine that the eviction message is targeting a fourth agent (e.g., the agent 510) configured to receive eviction messages having the higher priority, in which case the first agent might not convert the second type of eviction message to the first type of eviction message.

If the first agent determines to convert the second type of eviction message to the first type of eviction message ("Yes"), at 912 the first agent may carry out one or more steps to convert the second type of eviction message to the first type of eviction message when receiving the second type of eviction message (e.g., the first agent may convert from a second eviction operation to a first eviction operation when receiving the second type of eviction message). For example, the first agent may use a technique 1000 described in FIG. 10 to convert the second type of eviction message to the first type of eviction message when receiving the second type of eviction message. At 908, the first agent may then invoke the first eviction operation that may be interruptible by probe operations (e.g., the first eviction operation 602, being a low priority evict, such as the low priority evict 528). However, at 910, if the first agent determines not to convert the second type of eviction message to the first type of eviction message ("No"), at 914 the first agent may transmit an eviction message to invoke a second eviction operation in which probe operations are interruptible by the second eviction operation (e.g., the second eviction operation 610, being the high priority evict). For example, the probe operations 604, 606, or 608, invoked by the probe 532 or the probe 534, may be interruptible by the second eviction operation. The second eviction operation may cause a probe operation to be suspended until the second eviction operation completes. The second eviction operation may be invoked by transmitting an eviction message having a higher priority than probe messages (e.g., the high priority evict 530). For example, the agent circuitry (e.g., the agent circuitry 522) may be configured to transmit the eviction message having the higher priority (e.g., the high priority evict 530), such as through a higher prioritized channel (e.g., Channel C) implemented by a third link (e.g., the link 520) between the first agent and a fourth agent (e.g., the agent 510) configured to receive eviction messages having the higher priority.

Figure 10:
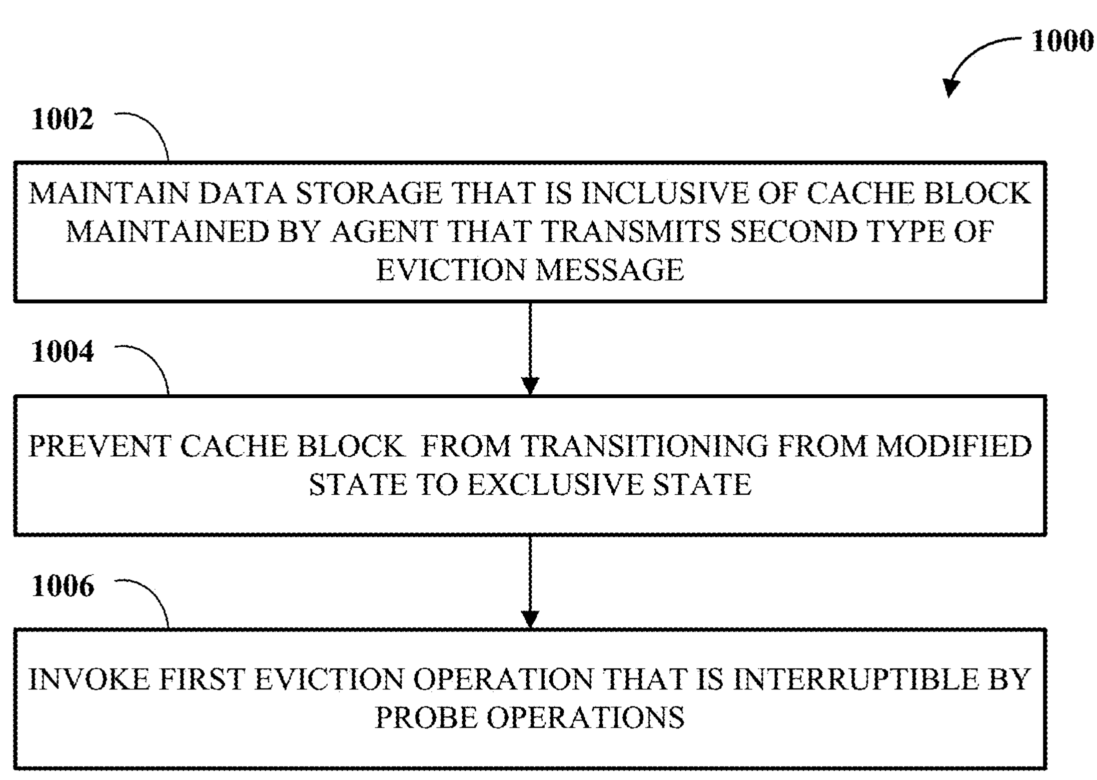
FIG. 10 is a flow chart of an example of a technique for converting eviction operations or messages.

FIG. 10 is a flow chart of an example of a technique 1000 for an agent to convert eviction operations or messages. For example, a first agent (e.g., the agent 506, using the agent circuitry 522 and the data storage 540) may convert a second type of eviction message having a higher priority than probe messages (e.g., the high priority evict 526) to a first type of eviction message having a lower priority than probe messages (e.g., the low priority evict 524) using the technique 1000. For example, in the technique 900, the first agent may convert the second type of eviction message to the first type of eviction message, at 912, using the technique 1000. For example, at 912, the first agent may convert an "InclEvict" message, received through a first link, to an "Evict" message, transmitted through a second link, using the technique 1000. The technique 1000 can be executed using computing devices, such as the systems, hardware, and software described with respect to FIGS. 1-6. For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1002, a first agent may maintain a data storage that is inclusive of a cache block maintained by a second agent that transmits a second type of eviction message. The second type of eviction message may have a higher priority than probe messages (e.g., the high priority evict 526, such as an "InclEvict"). For example, the agent 506 may maintain the data storage 540 to be inclusive of a cache block maintained by the agent 504, in the cache 538, that transmits the high priority evict 526 (e.g., the "InclEvict" message, through channel C of the first link). The first agent may include agent circuitry (e.g., the agent circuitry 522) configured to maintain the data storage 540. The data storage 540 may be inclusive of unique or dirty cache blocks stored in the cache maintained by the second agent (e.g., the data storage may be inclusive of all unique and all dirty cache blocks in the cache maintained by the second agent that transmits the second type of eviction message), such as to enable completion of the high priority evict 526 from the agent 504 (e.g., an inner agent) without waiting for the low priority evict 528 to the agent 508 (e.g., an outer agent) to progress or complete (e.g., so that the first agent can deescalate the eviction priority relative to the probe). In other words, the data storage provides the first agent with the resources to locally complete the inner eviction (e.g., to locally complete the high priority evict 526 from the agent 504).

At 1004, the first agent may prevent the cache block from transitioning from a modified state to an exclusive state. The first agent may prevent the cache block from transitioning from the modified state to the exclusive state when the address of the cache block is being probed. For example, the agent circuitry 522 may prevent the cache block being evicted by the agent (e.g., the agent 504, from the cache 538), and also being probed (e.g., by the agent 508), from transitioning from the M state to the E state when evicting the cache block.

At 1006, the first agent may invoke the first eviction operation (e.g., the first eviction operation 602) that is interruptible by probe operations. For example, with the data storage 540, and the agent circuitry 522 preventing the cache block from transitioning from the modified state to the exclusive state, the first agent may invoke the first eviction operation (e.g., the first eviction operation 602) that is interruptible by probe operations (e.g., the low priority evict 524, such as sending the "Evict" message, through channel A of a second link, having a lower priority than the probe messages).

Figure 11:
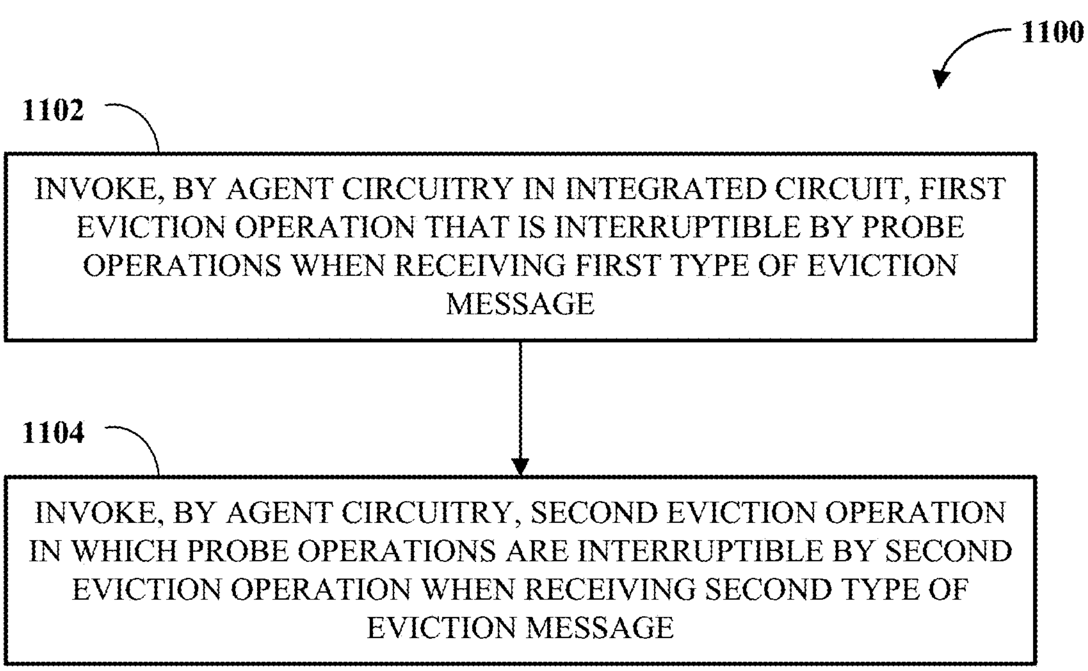
FIG. 11 is a flow chart of another example of a technique for an agent to invoke eviction operations based on an eviction message type.

FIG. 11 is a flow chart of another example of a technique 1100 for an agent to invoke eviction operations based on an eviction message type. The technique 1100 can be executed using computing devices, such as the systems, hardware, and software described with respect to FIGS. 1-6. For simplicity of explanation, the technique 1100 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1102, a first agent (e.g., the agent 506) may invoke a first eviction operation that may be interruptible by probe operations (e.g., the first eviction operation 602, being a low priority evict, such as the low priority evict 528). For example, the first eviction operation may be interruptible by the probe operations 604, 606, or 608, invoked by the probe 532 or the probe 534. A probe operation may cause the first eviction operation to be suspended until the probe operation completes. The first eviction operation may be invoked by transmitting an eviction message having a lower priority than probe messages (e.g., the low priority evict 528). For example, the agent circuitry (e.g., the agent circuitry 522) may be configured to transmit the eviction message having the lower priority (e.g., the low priority evict 528), such as through a lower prioritized channel (e.g., Channel A) implemented by a second link (e.g., the link 518) between the first agent and a third agent (e.g., the agent 508) configured to receive eviction messages having the lower priority.

At 1104, the first agent may invoke a second eviction operation in which probe operations are interruptible by the second eviction operation (e.g., the second eviction operation 610, being the high priority evict). For example, the probe operations 604, 606, or 608, invoked by the probe 532 or the probe 534, may be interruptible by the second eviction operation. The second eviction operation may cause a probe operation to be suspended until the second eviction operation completes. The second eviction operation may be invoked by transmitting an eviction message having a higher priority than probe messages (e.g., the high priority evict 530). For example, the agent circuitry (e.g., the agent circuitry 522) may be configured to transmit the eviction message having the higher priority (e.g., the high priority evict 530), such as through a higher prioritized channel (e.g., Channel C) implemented by a third link (e.g., the link 520) between the first agent and a fourth agent (e.g., the agent 510) configured to receive eviction messages having the higher priority.

Figure 12:
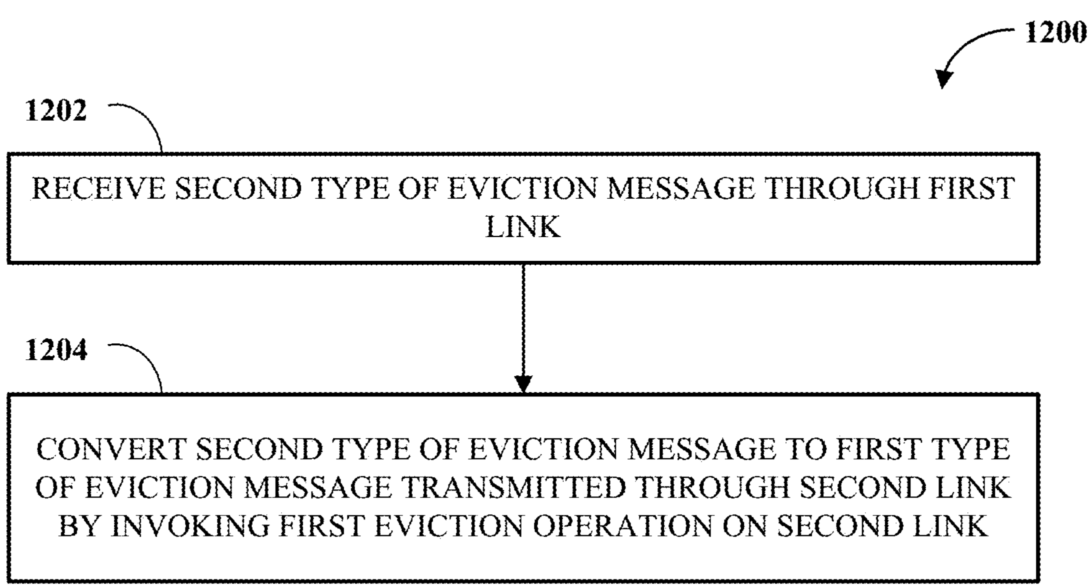
FIG. 12 is a flow chart of an example of a technique for converting from a second eviction operation to a first eviction operation.

FIG. 12 is a flow chart of an example of a technique 1200 for converting from a second eviction operation to a first eviction operation. The technique 1200 can be executed using computing devices, such as the systems, hardware, and software described with respect to FIGS. 1-6. For simplicity of explanation, the technique 1200 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1202, a first agent (e.g., the agent 506) may receive the second type of eviction message through a first link. For example, the first agent may receive an eviction message from a second agent to evict a cache block at an address. For example, the agent 506 may receive an eviction message, such as the high priority evict 526 (e.g., an "InclEvict" message), from agent 504, to evict a cache block stored in a cache, such as the cache 538 as shown in FIG. 5. The first agent may include agent circuitry (e.g., the agent circuitry 522) configured to receive the second type of eviction message, such as through a prioritized channel (e.g., Channel C for the high priority evict 526) implemented by the first link (e.g., the link 516) between the first agent and the second agent. The second type of eviction message may include an address and a size of a cache block to be evicted. The first agent may use the agent circuitry to detect the priority associated with eviction message, such as by detecting the channel on which the eviction message was sent. The first agent may determine the type of eviction message to be the second type of eviction message having a higher priority than probe messages (e.g., the high priority evict 526, such as an "InclEvict" message) based on the eviction message being received through a higher prioritized channel (e.g., Channel C) of the first link.

At 1204, the first agent may convert the second type of eviction message to the first type of eviction message transmitted through a second link by invoking the first eviction operation on the second link. For example, the first agent may use the technique 1000 described in FIG. 10 to convert the second type of eviction message to the first type of eviction message when receiving the second type of eviction message. For example, the first agent may maintain a data storage that is inclusive of the cache block maintained by the second agent that transmits the second type of eviction message. The first agent may also prevent the cache block from transitioning from a modified state to an exclusive state, such as when the address of the cache block is being probed. The first agent may transmit the first type of eviction message (e.g., the low priority evict 528, such as the "Evict" message) through a second link (e.g., through channel A of the link 518) between the first agent and a third agent (e.g., the agent 508). The third agent may be the target of the second type of eviction message from the second agent (e.g., the agent 504).

Figure 13:
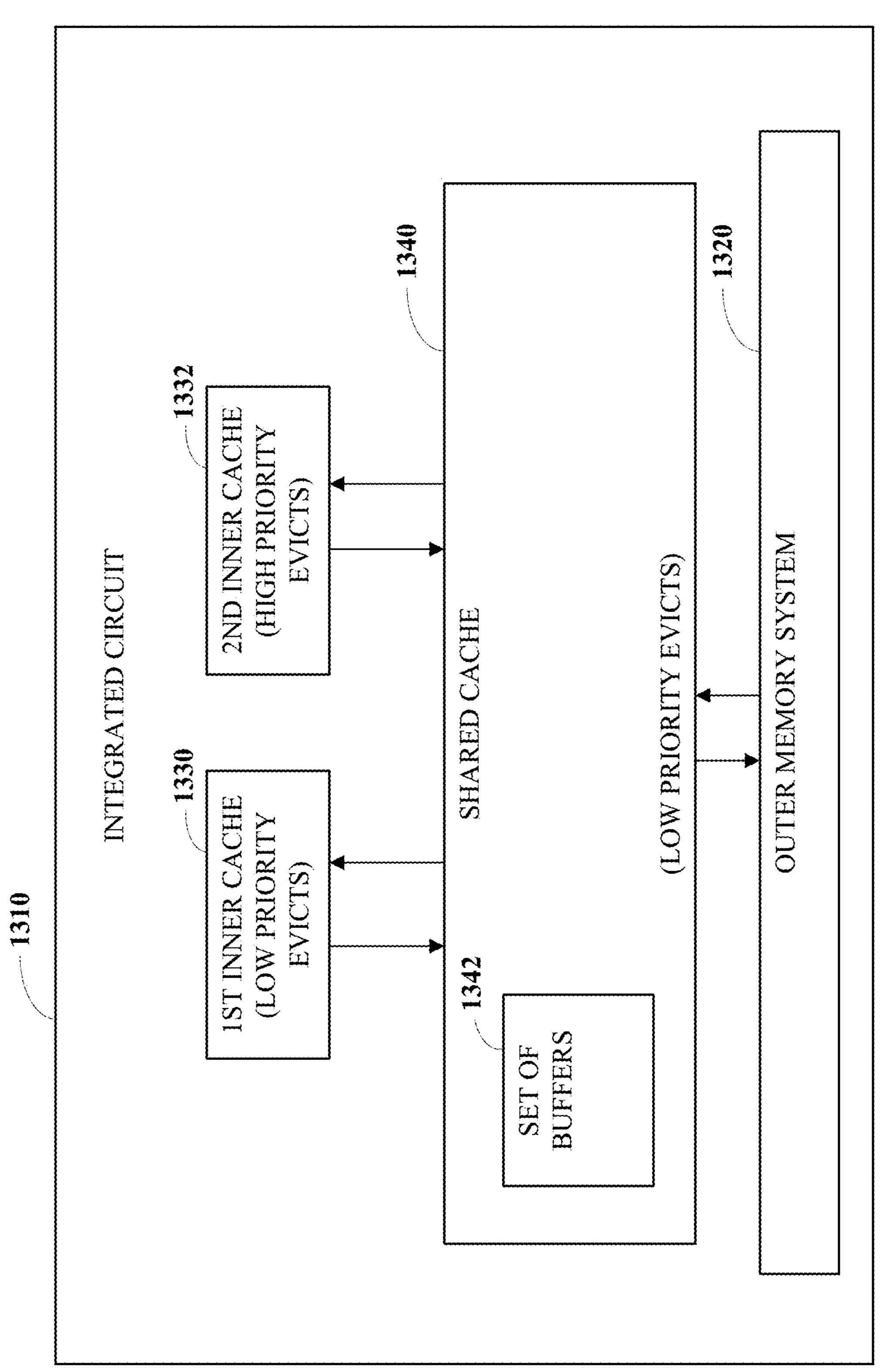
FIG. 13 is a block diagram of an example of an integrated circuit configured with concurrent support for multiple cache inclusivity schemes using low priority evict operations.

FIG. 13 is a block diagram of an example of an integrated circuit 1310 configured with concurrent support for multiple cache inclusivity schemes using low priority evict operations. The integrated circuit 1310 includes an outer memory system 1320; a first inner cache 1330 that is configured to transmit eviction messages having a lower priority than probe messages; a second inner cache 1332 that is configured to transmit eviction messages having a higher priority than probe messages; and a shared cache 1340 that is connected to the first inner and to the second inner cache as parts of a cache hierarchy, and configured to handle both lower priority evict messages from the first inner cache 1330 and higher priority evict messages from the second inner cache 1332 while transmitting lower priority evict messages to the outer memory system 1320. The shared cache 1340 includes a set of buffers 1342 that can be used to store cached data from the second inner cache 1332 while the cached data is being evicted. The shared cache 1340 may be configured to be non-inclusive (e.g., exclusive) of the first inner cache 1330 and to be inclusive of the second inner cache 1332. For example, the integrated circuit 1310 may be used to implement to the technique 1400 of FIG. 14. For example, the integrated circuit 1310 may be used to implement to the technique 1500 of FIG. 15.

The integrated circuit 1310 includes an outer memory system 1320. The outer memory system 1320 may include memory storing instructions and data and/or provide access to a memory external to the integrated circuit 1310 that stores instructions and/or data. For example, the outer memory system 1320 may include a memory controller. In some implementations, the outer memory system 1320 includes one or more outer caches that are closer to memory than the sharded cache 1340 in a cache hierarchy. For example, the outer memory system 1320 may include an L3 cache and/or an L4 cache, which may be configured to implement a cache coherency protocol/policy to maintain cache coherency across multiple L2 caches. For example, the outer memory system 1320 may include multiple layers.

The integrated circuit 1310 includes a first inner cache 1330 that is configured to transmit eviction messages having a lower priority than probe messages. For example, the first inner cache 1330 may be an L1 cache (e.g., an L1 instruction cache or an L1 data cache) in a processor core of the integrated circuit 1310. For example, the first inner cache 1330 may be an L2 cache for a cluster of processor cores of the integrated circuit 1310. In some implementations, the first inner cache 1330 may be a set-associative virtually indexed physically tagged (VIPT) cache, meaning that it is indexed purely with virtual address bits and tagged fully with all translated physical address bits. For low power consumption, the tag and data arrays may be looked up in serial so that at most a single data SRAM way is accessed. For example, the line size of the first inner cache 1330 may be 64 Bytes, and the beat size may be 16 Bytes.

The integrated circuit 1310 includes a second inner cache 1332 that is configured to transmit eviction messages having a higher priority than probe messages. For example, the second inner cache 1332 may be an L1 cache (e.g., an L1 instruction cache or an L1 data cache) in a processor core of the integrated circuit 1310. For example, the second inner cache 1332 may be an L2 cache for a cluster of processor cores of the integrated circuit 1310. In some implementations, the second inner cache 1332 may be a set-associative VIPT cache. For low power consumption, the tag and data arrays may be looked up in serial so that at most a single data SRAM way is accessed. For example, the line size of the second inner cache 1332 may be 64 Bytes, and the beat size may be 16 Bytes.

The integrated circuit 1310 includes a shared cache 1340 that is connected to the first inner cache 1330 and to the second inner cache 1332 as parts of a cache hierarchy. The shared cache 1340 is configured to: receive a first eviction message (e.g., the low priority evict 524) having the lower priority than probe messages from the first inner cache 1330; receive a second eviction message (e.g., the high priority evict 526) having the higher priority than probe messages from the second inner cache 1332; transmit a third eviction message (e.g., the low priority evict 528), determined based on the first eviction message, having the lower priority than probe messages to a circuitry that is closer to memory in the cache hierarchy; and transmit a fourth eviction message (e.g., the low priority evict 528), determined based on the second eviction message, having the lower priority than probe messages to the circuitry that is closer to memory in the cache hierarchy. For example, the circuitry that is closer to memory in the cache hierarchy may be a memory controller of the outer memory system 1320. For example, the circuitry that is closer to memory in the cache hierarchy may be an outer cache (e.g., an L3 cache or an L4 cache) of the outer memory system 1320. In some implementations, the first inner cache 1330 is L1 cache, the second inner cache 1332 is an L1 cache, and the shared cache 1340 is an L2 cache. In some implementations, the first inner cache 1330 is an L2 cache, the second inner cache 1332 is an L2 cache, and the shared cache 1340 is an L3 cache. For example, the eviction messages having the lower priority may be associated with eviction operations that are interruptible by the eviction messages having the higher priority. In some implementations, the shared cache 1340 converts the eviction messages having the higher priority to eviction messages having the lower priority. For example, the shared cache 1340 may include the agent circuitry 522 described in relation to FIG. 5 for receiving and sending eviction and probe messages via one or more buses connecting the shared cache 1340 to the first inner cache 1330, the second inner cache 1332, and the outer memory system 1320. In some implementations, the circuitry that is closer to memory in the cache hierarchy does not support eviction messages having the higher priority.

The shared cache 1340 includes a set of buffers 1342 configured to store cache lines of data. The set of buffers 1342 may be used to store cached data from the second inner cache 1332 while the cached data is being evicted. For example, the shared cache 1340 may be configured to reserve a buffer in the set of buffers 1342 for storing a cache line stored by the second inner cache 1332; and, responsive to the second eviction message, store data associated with the second eviction message in the reserved buffer. In some implementations, the shared cache 1340 does not store data from the first inner cache 1330 in the set of buffers 1342. For example, the shared cache 1340 may be configured to be non-inclusive (e.g., exclusive) of the first inner cache 1330 and to be inclusive of the second inner cache 1332.

Figure 14:
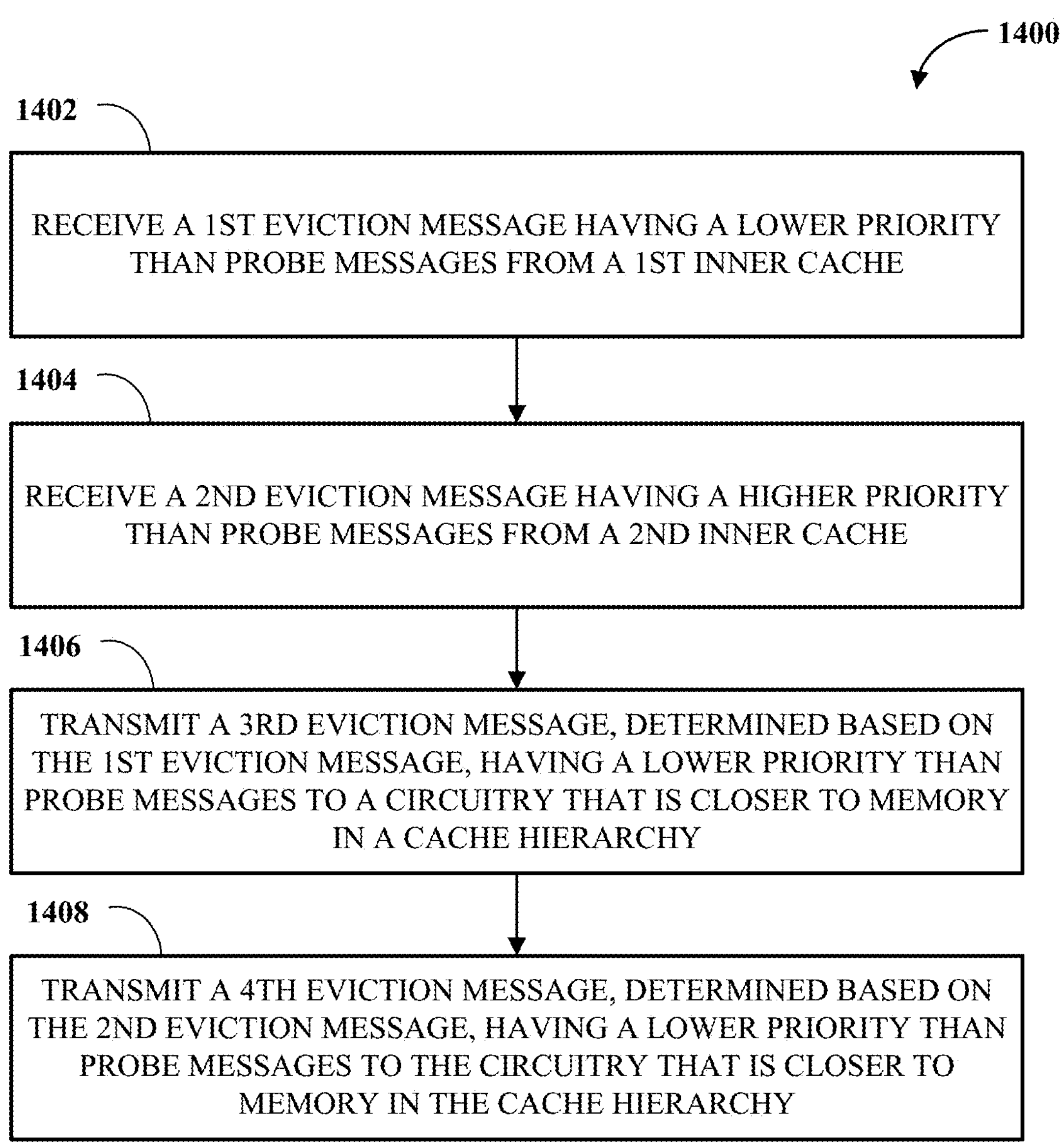
FIG. 14 is a flow chart of an example of a technique for concurrent support for multiple cache inclusivity schemes using low priority evict operations.

FIG. 14 is a flow chart of an example of a technique 1400 for concurrent support for multiple cache inclusivity schemes using low priority evict operations. The technique 1400 includes receiving 1402 a first eviction message having a lower priority than probe messages from a first inner cache; receiving 1404 a second eviction message having a higher priority than probe messages from a second inner cache; transmitting 1406 a third eviction message, determined based on the first eviction message, having the lower priority than probe messages to a circuitry that is closer to memory in a cache hierarchy; and transmitting 1408 a fourth eviction message, determined based on the second eviction message, having the lower priority than probe messages to the circuitry that is closer to memory in the cache hierarchy. For example, the technique 1400 may be used to convert eviction messages having the higher priority to eviction messages having the lower priority as they propagate out toward memory in a cache hierarchy. In some implementations, the technique 1400 may be used to enable a shared cache (e.g., the shared cache 1340) to be non-inclusive (e.g., exclusive) of the first inner cache and to be inclusive of the second inner cache. For example, the technique 1400 may be implemented using the integrated circuit 1310 of FIG. 13. For example, the technique 1400 may be implemented using the agent circuitry 522 of FIG. 5. For simplicity of explanation, the technique 1400 is depicted and described herein as a series of steps or operations. However, the steps or operations in accordance with this disclosure can occur in various orders and/or concurrently. For example, the first eviction message may be received 1402 after the second eviction message is received 1404. Additionally, other steps or operations not presented and described herein may be used. Furthermore, not all illustrated steps or operations may be required to implement a technique in accordance with the disclosed subject matter.

The technique 1400 includes receiving 1402 a first eviction message (e.g., the low priority evict 524) having a lower priority than probe messages from a first inner cache (e.g., the first inner cache 1330). For example, the first eviction message may be received 1402 via a bus. In some implementations, first eviction message is received 1402 via a lower prioritized Channel A of a bus, as described in relation to FIG. 3 and FIG. 6.

The technique 1400 includes receiving 1404 a second eviction message (e.g., the high priority evict 526) having a higher priority than probe messages from a second inner cache (e.g., the second inner cache 1332). For example, the second eviction message may be received 1404 via a bus. In some implementations, second eviction message is received 1404 via a higher prioritized Channel C of a bus, as described in relation to FIG. 3 and FIG. 6. For example, the second eviction message may be an inclusive evict message.

The technique 1400 includes transmitting 1406 a third eviction message (e.g., the low priority evict 528) having the lower priority than probe messages to a circuitry that is closer to memory in a cache hierarchy. The third eviction message is determined based on the first eviction message. In some implementations, the third eviction message is transmitted 1406 responsive to the first eviction message. For example, the third eviction message may be transmitted 1406 via a bus. In some implementations, third eviction message is transmitted 1406 via a lower prioritized Channel A of a bus, as described in relation to FIG. 3 and FIG. 6. For example, the circuitry that is closer to memory in a cache hierarchy may be an outer cache (e.g., an L3 cache or an L4 cache) or a memory controller (e.g., a component of the outer memory system 1320). In this manner, an eviction operation associated the first eviction message may propagate through a cache hierarchy out toward memory.

The technique 1400 includes transmitting 1408 a fourth eviction message (e.g., the low priority evict 528) having the lower priority than probe messages to the circuitry that is closer to memory in the cache hierarchy. The fourth eviction message is determined based on the second eviction message. In some implementations, the fourth eviction message is transmitted 1408 responsive to the second eviction message. For example, the fourth eviction message may be transmitted 1408 via a bus. In some implementations, the fourth eviction message is transmitted 1408 via a lower prioritized Channel A of a bus, as described in relation to FIG. 3 and FIG. 6. In this manner, an eviction message (e.g., an inclusive evict message) having the higher priority may be converted to eviction message having the lower priority as an eviction operation associated the second eviction message propagates through a cache hierarchy out toward memory. For example, the technique 1400 may be implemented using the technique 1200 of FIG. 12.

In some implementations, the technique 1400 includes reserving a buffer in a set of buffers (e.g., the set of buffers 1342) for storing a cache line stored by the second inner cache; and, responsive to the second eviction message, storing data associated with the second eviction message in the reserved buffer. For example, the technique 1400 may be implemented using the technique 1500 of FIG. 15. In some implementations, the technique 1400 includes maintaining a data storage (e.g., the set of buffers 1342 or the data storage 540) that is inclusive of at least one of unique or dirty cache blocks in the second inner cache. For example, the technique 1400 may be implemented using the technique 1000 of FIG. 10. In some implementations, the technique 1400 includes maintaining a data storage (e.g., the set of buffers 1342 or the data storage 540) that is non-inclusive (e.g., exclusive) of the first inner cache and inclusive of the second inner cache.

Figure 15:
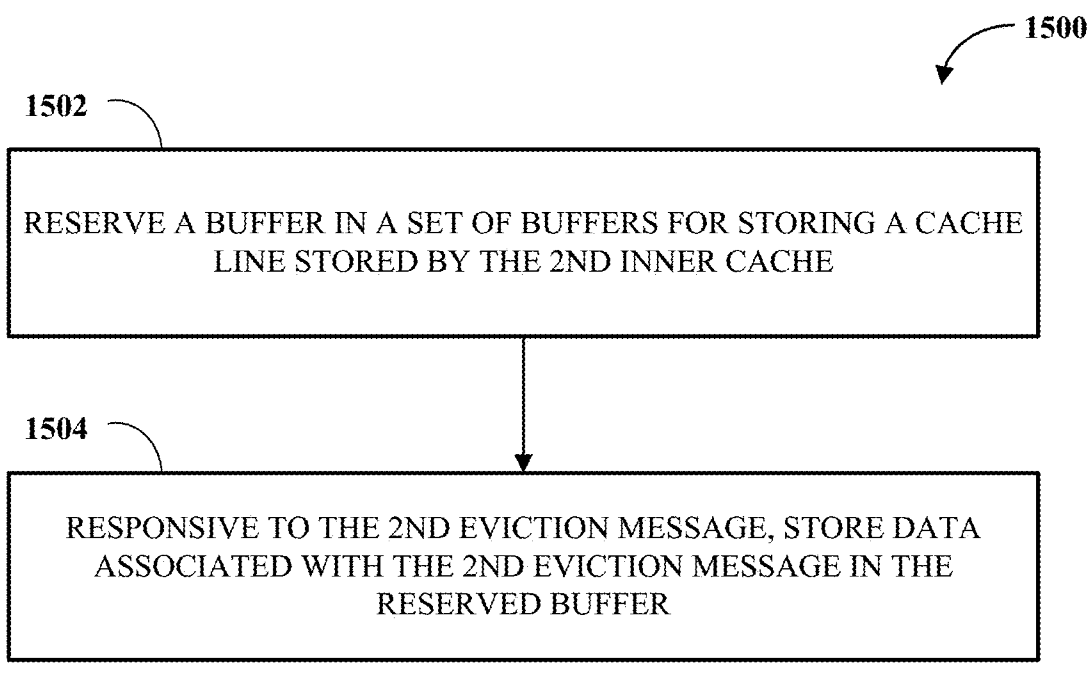
FIG. 15 is a flow chart of an example of a technique for maintaining inclusivity for an inner cache that issues higher priority evict messages.

FIG. 15 is a flow chart of an example of a technique 1500 for maintaining inclusivity for an inner cache that issues higher priority evict messages. The technique 1500 includes reserving 1502 a buffer in a set of buffers (e.g., the set of buffers 1342) for storing a cache line stored by the second inner cache; and, responsive to the second eviction message, storing 1504 data associated with the second eviction message in the reserved buffer. Keeping a copy of the of the cached data being evicted may enable a high priority evict message to be converted to a lower priority evict message as it propagates out through a cache hierarchy toward memory. Copies of data for lower priority evict messages received from inner caches for which a shared cache (e.g., the shared cache 1340) is non-inclusive need not be stored locally by the shared cache. The technique 1500 may be used by a shared cache that is configured to be non-inclusive (e.g., exclusive) of the first inner cache and to be inclusive of the second inner cache. For example, the technique 1500 may be implemented using the integrated circuit 1310 of FIG. 13. For example, the technique 1500 may be implemented using the agent circuitry 522 and the data storage 540 of FIG. 5.

In some implementations, the technique 1500 includes maintaining a data storage (e.g., the set of buffers 1342 or the data storage 540) that is inclusive of at least one of unique or dirty cache blocks in the second inner cache. For example, the technique 1500 may be implemented using the technique 1000 of FIG. 10. In some implementations, the technique 1500 includes maintaining a data storage (e.g., the set of buffers 1342 or the data storage 540) that is non-inclusive (e.g., exclusive) of the first inner cache and inclusive of the second inner cache.

Some implementations may include an apparatus including: first agent circuitry that passes messages between a plurality of agents, wherein at least one of the plurality of agents is configured to transmit eviction messages having a lower priority than probe messages and at least one of the plurality of agents is configured to transmit eviction messages having a higher priority than probe messages. In some implementations, a second agent is configured to send a first eviction message having the higher priority to evict a cache block stored in a cache and a third agent is configured to receive eviction messages having the lower priority, and the first agent circuitry receives the first eviction message from the second agent and transmits a second eviction message having the lower priority to the third agent to evict the cache block by accessing a data storage that is inclusive of the cache block stored in the cache. In some implementations, a second agent is configured to send a first eviction message having the higher priority to evict a cache block stored in a cache and a third agent is configured to receive eviction messages having the lower priority and the first agent circuitry receives the first eviction message from the second agent and transmits a second eviction message having the lower priority to the third agent to evict the cache block by preventing the cache block from transitioning from a modified state to an exclusive state. In some implementations, a second agent is configured to send a first eviction message having the higher priority to evict a cache block stored in a cache and a third agent is configured to receive eviction messages having the lower priority and the first agent circuitry receives the first eviction message from the second agent and transmits a second eviction message having the lower priority to the third agent to evict the cache block by sending the second eviction message through a first channel that is prioritized below a second channel for sending probe messages. In some implementations, the eviction messages having the lower priority are associated with eviction operations that are interruptible by the eviction messages having the higher priority. In some implementations, the first agent circuitry converts the eviction messages having the higher priority to eviction messages having the lower priority.

Some implementations may include an apparatus including agent circuitry configured to invoke a first eviction operation that is interruptible by probe operations when receiving a first type of eviction message; and invoke a second eviction operation in which probe operations are interruptible by the second eviction operation when receiving a second type of eviction message. In some implementations, the apparatus may include a data storage, wherein the agent circuitry is configured to maintain the data storage to be inclusive of at least one of unique or dirty cache blocks in a cache maintained by an agent that transmits the second type of eviction message. In some implementations, the agent circuitry is configured to prevent a cache block from transitioning from a modified state to an exclusive state when the agent circuitry invokes the second eviction operation to evict the cache block. In some implementations, the agent circuitry is configured to: transmit an eviction message, to invoke the first eviction operation, through a first channel; and receive a probe message that invokes a first probe operation, through a second channel, wherein the second channel is prioritized above the first channel so that the first probe operation causes the first eviction operation to be suspended until the first probe operation completes. In some implementations, the apparatus may include a cache configured to transmit at least one of the first type of eviction message or the second type of eviction message, wherein the agent circuitry maintains coherence for the cache. In some implementations, the agent circuitry is configured to: receive the first type of eviction message from a private cache connected to a processor core; and transmit an eviction message, to invoke the first eviction operation, to a shared cache used by the processor core. In some implementations, the first eviction operation is interruptible by the second eviction operation. In some implementations, the agent circuitry is configured to: receive the second type of eviction message through a first link; and convert the second type of eviction message to the first type of eviction message transmitted through a second link by invoking the first eviction operation on the second link.

Some implementations may include a method that includes invoking, by agent circuitry in an integrated circuit, a first eviction operation that is interruptible by probe operations when receiving a first type of eviction message; and invoking, by the agent circuitry, a second eviction operation in which probe operations are interruptible by the second eviction operation when receiving a second type of eviction message. In some implementations, the method may include maintaining, by the agent circuitry, a data storage that is inclusive of at least one of unique or dirty cache blocks in a cache maintained by an agent that transmits the second type of eviction message. In some implementations, the method may include preventing, by the agent circuitry, a cache block from transitioning from a modified state to an exclusive state when the agent circuitry invokes the second eviction operation to evict the cache block. In some implementations, the method may include transmitting, by the agent circuitry, an eviction message, to invoke the first eviction operation, through a first channel; and receiving, by the agent circuitry, a probe message that invokes a first probe operation, through a second channel, wherein the second channel is prioritized above the first channel so that the first probe operation causes the first eviction operation to be suspended until the first probe operation completes. In some implementations, the method may include maintaining, by the agent circuitry, coherence for a cache that transmits at least one of the first type of eviction message or the second type of eviction message. In some implementations, the method may include receiving, by the agent circuitry, the first type of eviction message from a private cache connected to a processor core; and transmitting, by the agent circuitry, an eviction message, to invoke the first eviction operation, to a shared cache used by the processor core. In some implementations, the first eviction operation is interruptible by the second eviction operation. In some implementations, the method may include receiving the second type of eviction message through a first link; and converting the second type of eviction message to the first type of eviction message transmitted through a second link by invoking the first eviction operation on the second link.

Some implementations may include a non-transitory computer readable medium comprising a circuit representation that, when processed by a computer, is used to program or manufacture an integrated circuit including agent circuitry configured to: invoke a first eviction operation that is interruptible by probe operations when receiving a first type of eviction message; and invoke a second eviction operation in which probe operations are interruptible by the second eviction operation when receiving a second type of eviction message. In some implementations, the circuit representation, when processed by the computer, is used to program or manufacture the integrated circuit with the agent circuitry configured to maintain a data storage that is inclusive of at least one of unique or dirty cache blocks in a cache maintained by an agent that transmits the second type of eviction message. In some implementations, the circuit representation, when processed by the computer, is used to program or manufacture the integrated circuit with the agent circuitry configured to prevent a cache block from transitioning from a modified state to an exclusive state when the agent circuitry invokes the second eviction operation to evict the cache block. In some implementations, the circuit representation, when processed by the computer, is used to program or manufacture the integrated circuit with the agent circuitry configured to transmit an eviction message, to invoke the first eviction operation, through a first channel; and receive a probe message that invokes a first probe operation, through a second channel, wherein the second channel is prioritized above the first channel so that the first probe operation causes the first eviction operation to be suspended until the first probe operation completes. In some implementations, the agent circuitry maintains coherence for a cache that transmits at least one of the first type of eviction message or the second type of eviction message. In some implementations, the circuit representation, when processed by the computer, is used to program or manufacture the integrated circuit with the agent circuitry configured to: receive the first type of eviction message from a private cache connected to a processor core; and transmit an eviction message, to invoke the first eviction operation, to a shared cache used by the processor core. In some implementations, the first eviction operation is interruptible by the second eviction operation. In some implementations, the circuit representation, when processed by the computer, is used to program or manufacture the integrated circuit with the agent circuitry configured to: receive the second type of eviction message through a first link; and convert the second type of eviction message to the first type of eviction message transmitted through a second link by invoking the first eviction operation on the second link.

Some implementations may include a non-transitory computer readable medium comprising a circuit representation that, when processed by a computer, is used to program or manufacture an integrated circuit including first agent circuitry configured to pass messages between a plurality of agents, wherein at least one of the plurality of agents is configured to transmit eviction messages having a lower priority than probe messages and at least one of the plurality of agents is configured to transmit eviction messages having a higher priority than probe messages. In some implementations, a second agent is configured to send a first eviction message having the higher priority to evict a cache block stored in a cache and a third agent is configured to receive eviction messages having the lower priority and the first agent circuitry receives the first eviction message from the second agent and transmits a second eviction message having the lower priority to the third agent to evict the cache block by accessing a data storage that is inclusive of the cache block stored in the cache. In some implementations, a second agent is configured to send a first eviction message having the higher priority to evict a cache block stored in a cache and a third agent is configured to receive eviction messages having the lower priority and the first agent circuitry receives the first eviction message from the second agent and transmits a second eviction message having the lower priority to the third agent to evict the cache block by preventing the cache block from transitioning from a modified state to an exclusive state. In some implementations, a second agent is configured to send a first eviction message having the higher priority to evict a cache block stored in a cache and a third agent is configured to receive eviction messages having the lower priority and the first agent circuitry receives the first eviction message from the second agent and transmits a second eviction message having the lower priority to the third agent to evict the cache block by sending the second eviction message through a first channel that is prioritized below a second channel for sending probe messages. In some implementations, the eviction messages having the lower priority are interruptible by the eviction messages having the higher priority. In some implementations, the first agent circuitry converts the eviction messages having the higher priority to eviction messages having the lower priority.

In a first aspect, the subject matter described in this specification can be embodied in integrated circuits that include a first inner cache that is configured to transmit eviction messages having a lower priority than probe messages; a second inner cache that is configured to transmit eviction messages having a higher priority than probe messages; and a shared cache that is connected to the first inner cache and to the second inner cache as parts of a cache hierarchy, and configured to: receive a first eviction message having the lower priority than probe messages from the first inner cache; receive a second eviction message having the higher priority than probe messages from the second inner cache; transmit a third eviction message, determined based on the first eviction message, having the lower priority than probe messages to a circuitry that is closer to memory in the cache hierarchy; and, transmit a fourth eviction message, determined based on the second eviction message, having the lower priority than probe messages to the circuitry that is closer to memory in the cache hierarchy.

In the first aspect, the shared cache may be configured to be non-inclusive of the first inner cache and to be inclusive of the second inner cache. In the first aspect, the shared cache may include a set of buffers configured to store cache lines of data, and the shared cache may be configured to: reserve a buffer in the set of buffers for storing a cache line stored by the second inner cache; and, responsive to the second eviction message, store data associated with the second eviction message in the reserved buffer. In some implementations, the shared cache does not store data from the first inner cache in the set of buffers. In the first aspect, the circuitry that is closer to memory in the cache hierarchy may be a memory controller. In the first aspect, the circuitry that is closer to memory in the cache hierarchy may be an outer cache. In the first aspect, the first inner cache may be an L1 cache, the second inner cache may be an L1 cache, and the shared cache may be an L2 cache. In the first aspect, the first inner cache may be an L2 cache, the second inner cache may be an L2 cache, and the shared cache may be an L3 cache. In the first aspect, the eviction messages having the lower priority may be associated with eviction operations that are interruptible by the eviction messages having the higher priority. In the first aspect, the shared cache may convert the eviction messages having the higher priority to eviction messages having the lower priority.

In a second aspect, the subject matter described in this specification can be embodied in methods that include receiving a first eviction message having a lower priority than probe messages from a first inner cache; receiving a second eviction message having a higher priority than probe messages from a second inner cache; transmitting a third eviction, determined based on the first eviction message, message having the lower priority than probe messages to a circuitry that is closer to memory in a cache hierarchy; and, transmitting a fourth eviction message, determined based on the second eviction message, having the lower priority than probe messages to the circuitry that is closer to memory in the cache hierarchy.

In the second aspect, the methods may include reserving a buffer in a set of buffers for storing a cache line stored by the second inner cache; and, responsive to the second eviction message, storing data associated with the second eviction message in the reserved buffer. In the second aspect, the methods may include maintaining a data storage that is inclusive of at least one of unique or dirty cache blocks in the second inner cache. In the second aspect, the methods may include maintaining a data storage that is non-inclusive of the first inner cache and inclusive of the second inner cache.

In a third aspect, the subject matter described in this specification can be embodied in a non-transitory computer readable medium comprising a circuit representation that, when processed by a computer, is used to program or manufacture an integrated circuit including a first inner cache that is configured to transmit eviction messages having a lower priority than probe messages; a second inner cache that is configured to transmit eviction messages having a higher priority than probe messages; and a shared cache that is connected to the first inner cache and to the second inner cache as parts of a cache hierarchy, and configured to: receive a first eviction message having the lower priority than probe messages from the first inner cache; receive a second eviction message having the higher priority than probe messages from the second inner cache; transmit a third eviction message, determined based on the first eviction message, having the lower priority than probe messages to a circuitry that is closer to memory in the cache hierarchy; and, transmit a fourth eviction message, determined based on the second eviction message, having the lower priority than probe messages to the circuitry that is closer to memory in the cache hierarchy.

In the third aspect, the shared cache may be configured to be non-inclusive of the first inner cache and to be inclusive of the second inner cache. In the third aspect, the shared cache may include a set of buffers configured to store cache lines of data, and the shared cache may be configured to: reserve a buffer in the set of buffers for storing a cache line stored by the second inner cache; and, responsive to the second eviction message, store data associated with the second eviction message in the reserved buffer. In some implementations, the shared cache does not store data from the first inner cache in the set of buffers. In the third aspect, the circuitry that is closer to memory in the cache hierarchy may be a memory controller. In the third aspect, the circuitry that is closer to memory in the cache hierarchy may be an outer cache. In the third aspect, the first inner cache may be an L1 cache, the second inner cache may be an L1 cache, and the shared cache may be an L2 cache. In the third aspect, the first inner cache may be an L2 cache, the second inner cache may be an L2 cache, and the shared cache may be an L3 cache. In the third aspect, the eviction messages having the lower priority may be associated with eviction operations that are interruptible by the eviction messages having the higher priority. In the third aspect, the shared cache may convert the eviction messages having the higher priority to eviction messages having the lower priority.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. A method comprising:

receiving an eviction message to evict a cache block at an address;

determining, based on the address of the cache block, whether to convert a type of the eviction message from a first type to a second type; and invoking an eviction operation for the cache block, wherein the eviction operation includes, based on the type of the eviction message, one of: a first eviction operation that corresponds to the first type or a second eviction operation that corresponds to the second type, and wherein one of the first eviction operation or the second eviction operation is interrupted by a probe operation, and wherein a remaining one of the first eviction operation or the second eviction operation interrupts the probe operation.

2. The method of claim 1, wherein the type of the eviction message is determined by at least detecting a channel on which the eviction message was sent.

3. The method of claim 1, further comprising:

determining the type of the eviction message to be the first type based on a priority of the eviction message, wherein the first type corresponds to eviction messages having a lower priority than probe messages.

4. The method of claim 3, wherein the type of the eviction message is determined to be converted from the first type to the second type, wherein the second type corresponds to eviction messages having a higher priority than the probe messages.

5. The method of claim 4, wherein the second eviction operation is invoked by transmitting the eviction message with the higher priority.

6. The method of claim 5, wherein the second eviction operation causes the probe operation to be suspended until the second eviction operation completes.

7. The method of claim 5, wherein transmitting the eviction message with the higher priority comprises transmitting the eviction message through a channel associated with the higher priority.

8. The method of claim 3, wherein the type of the eviction message is determined to not be converted to the second type that has a higher priority than the probe messages, wherein the first eviction operation is invoked by transmitting the eviction message with the lower priority.

9. The method of claim 8, wherein the probe operation causes the first eviction operation to be suspended until the probe operation completes.

10. The method of claim 8, wherein transmitting the eviction message with the lower priority comprises transmitting the eviction message through a channel associated with the lower priority.

11. An integrated circuit comprising:

one or more processors; and one or more memories storing instructions that, upon execution by the one or more processors, configure the integrated circuit to:

process an eviction message to evict a cache block at an address;

determine, based on the address of the cache block, whether to convert a type of the eviction message from a first type to a second type; and invoke an eviction operation for the cache block, wherein the eviction operation includes, based on the type of the eviction message, one of: a first eviction operation that corresponds to the first type or a second eviction operation that corresponds to the second type, and wherein one of the first eviction operation or the second eviction operation is interrupted by a probe operation, and wherein a remaining one of the first eviction operation or the second eviction operation interrupts the probe operation.

12. The integrated circuit of claim 11, wherein the execution of the instructions further configures the integrated circuit to:

determine the type of the eviction message to be the first type based on a priority of the eviction message, wherein the first type corresponds to eviction messages having a higher priority than probe messages.

13. The integrated circuit of claim 12, wherein the type of the eviction message is determined to be converted from the first type to the second type, wherein the second type corresponds to eviction messages having a lower priority than the probe messages.

14. The integrated circuit of claim 13, wherein the second eviction operation is invoked by transmitting the eviction message with the lower priority.

15. The integrated circuit of claim 14, wherein the probe operation causes the second eviction operation to be suspended until the probe operation completes.

16. The integrated circuit of claim 14, wherein transmitting the eviction message with the lower priority comprises transmitting the eviction message through a channel associated with the lower priority.

17. The integrated circuit of claim 13, wherein the type of the eviction message is determined to not be converted to the second type that has a lower priority than the probe messages, wherein the first eviction operation is invoked by transmitting the eviction message with the higher priority.

18. The integrated circuit of claim 17, wherein the first eviction operation causes the probe operation to be suspended until the first eviction operation completes.

19. The integrated circuit of claim 17, wherein transmitting the eviction message with the higher priority comprises transmitting the eviction message through a channel associated with the higher priority.

20. One or more non-transitory computer-readable storage media storing instructions that, upon execution, cause operations comprising:

receiving an eviction message to evict a cache block at an address;

determining, based on the address of the cache block, whether to convert a type of the eviction message from a first type to a second type; and invoking an eviction operation for the cache block, wherein the eviction operation includes, based on the type of the eviction message, one of: a first eviction operation that corresponds to the first type or a second eviction operation that corresponds to the second type, and wherein one of the first eviction operation or the second eviction operation is interrupted by a probe operation, and wherein a remaining one of the first eviction operation or the second eviction operation interrupts the probe operation.

* * * * *